US011689066B2

(12) United States Patent
Jakubowski

(10) Patent No.: US 11,689,066 B2
(45) Date of Patent: *Jun. 27, 2023

(54) MULTI-HOUSING CHARGING DEVICES AND METHODS

(71) Applicant: Power Forward, LLC, Plymouth, MI (US)

(72) Inventor: Daniel B. Jakubowski, Livonia, MI (US)

(73) Assignee: Power Forward, LLC, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/096,543

(22) Filed: Nov. 12, 2020

(65) Prior Publication Data

US 2021/0066975 A1 Mar. 4, 2021

Related U.S. Application Data

(63) Continuation of application No. 16/532,659, filed on Aug. 6, 2019, now Pat. No. 10,855,119, which is a continuation-in-part of application No. 15/391,484, filed on Dec. 27, 2016, now Pat. No. 10,637,300, which is a continuation of application No.
(Continued)

(51) Int. Cl.
| | |
|---|---|
| *H01M 10/44* | (2006.01) |
| *H01M 10/46* | (2006.01) |
| *H02J 50/80* | (2016.01) |
| *H02J 50/10* | (2016.01) |
| *H02J 50/00* | (2016.01) |
| *H02J 50/50* | (2016.01) |
| *H02J 7/00* | (2006.01) |

(52) U.S. Cl.
CPC .......... *H02J 50/80* (2016.02); *H02J 7/00034* (2020.01); *H02J 50/005* (2020.01); *H02J 50/10* (2016.02); *H02J 50/50* (2016.02); *H02J 7/0042* (2013.01)

(58) Field of Classification Search
CPC . H01F 38/14; H02J 50/80; H02J 50/50; H02J 50/10; H02J 7/00034; H02J 7/0042; H02J 50/005; B60L 53/14; B60L 53/18; B60L 53/16
USPC .......... 320/107, 108, 114, 115, 138; 307/104
See application file for complete search history.

(56) References Cited

U.S. PATENT DOCUMENTS

| | | | |
|---|---|---|---|
| 9,287,041 B2 | 3/2016 | Oh et al. | |
| 10,855,119 B2* | 12/2020 | Jakubowski | .......... H02J 50/005 |
| 2011/0127844 A1 | 6/2011 | Walley | |

(Continued)

FOREIGN PATENT DOCUMENTS

| | | |
|---|---|---|
| KR | 20160018006 A | 2/2016 |
| KR | 101789540 B1 | 11/2017 |

OTHER PUBLICATIONS

TYLT. "Tylt Vu Qi Wireless Charger/Stand" Cellular Accessories for Less. 2019.

*Primary Examiner* — Edward Tso
(74) *Attorney, Agent, or Firm* — Danielson Legal LLC

(57) ABSTRACT

Methods and systems for charging a device. The method may involve providing a first housing and a second housing, wherein each housing is configured with a first coil, a second coil, and control logic to control the functioning of their respective first and second coils depending on the orientations of the housings. The method may further involve physically linking the first housing and the second housing via a first flexible connection.

16 Claims, 18 Drawing Sheets

Related U.S. Application Data

13/840,795, filed on Mar. 15, 2013, now Pat. No. 9,559,544.

(56) References Cited

U.S. PATENT DOCUMENTS

| | | |
|---|---|---|
| 2014/0253024 A1 | 9/2014 | Rautiainen et al. |
| 2018/0064224 A1 | 3/2018 | Brzezinski |
| 2018/0358826 A1 | 12/2018 | Allen et al. |

* cited by examiner

MULTI-HOUSING CHARGING DEVICES AND METHODS

CROSS-REFERENCE TO RELATED APPLICATIONS

This application is a continuation of U.S. patent application Ser. No. 16/532,659, filed Aug. 6, 2019, which is a continuation-in-part of U.S. patent application Ser. No. 15/391,484, filed Dec. 27, 2016, which is a continuation of U.S. patent application Ser. No. 13/480,795, filed on Mar. 15, 2013 and issued as U.S. Pat. No. 9,559,544; and is related to U.S. Pat. No. 8,193,764, issued on Jun. 5, 2012, the contents of all of which are incorporated by reference as if set forth in their entirety herein.

TECHNICAL FIELD

Embodiments described herein generally relate to charging devices and methods.

BACKGROUND

Wireless power transmission or wireless energy transfer is generally the process that takes place in any system where electrical energy is transmitted from a power source to an electrical load, without interconnecting wires. Devices that utilize wireless power transmission to charge or recharge a battery in an electronic device (e.g., cellular phone) are commonly referred to as wireless chargers or contact-less chargers.

Wireless chargers known in the art are typically placed on a surface such as the surface of a desktop or a countertop. An electronic device can then be placed on the wireless charger to charge the electronic device. Alternately, a wireless charger may be placed on the underside of a desktop or countertop. A user of the wireless charger can then place the electronic device to be charged on the desktop or countertop within range of the wireless charger. By within range it is herein meant that the electronic device to be charged is sufficiently close to the wireless charger such that the electronic device can receive power wirelessly transmitted from the wireless charger. In this manner, the user of the wireless charger does not see the wireless charger because the wireless charger is underneath the desktop or countertop. The user sees only the electronic device that the wireless charger is charging.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method of charging a device. The method includes providing a first housing comprising a first coil, a second coil, and a first control logic to control the functioning of the first and second coil of the first housing depending on an orientation of the first housing, wherein each of the first coil and the second coil of the first housing can function as both a receiver coil and a transmitter coil, providing a second housing comprising a first coil, a second coil, and a second control logic to control the functioning of the first and second coil of the second housing depending on an orientation of the second housing, wherein each of the first coil and the second coil of the second housing can function as both a receiver coil and a transmitter coil, and physically linking the first housing and the second housing via a first flexible connection.

In some embodiments, the method further includes configuring at least one of the first housing and the second housing with a rechargeable battery. In some embodiments, the first flexible connection is an electrically wired connection between the first housing and the second housing such that the first control logic of the first housing and the second control logic of the second housing can permit power to be transferred between the batteries of the first and second housings.

In some embodiments, the method further includes configuring the first control logic of the first housing to control the first coil of the first housing to function as a receiver coil and the second coil of the first housing to function as a transmitter coil when the first housing is in a first orientation and control the first coil of the first housing to function as a transmitter coil and the second coil of the first housing to function as a receiver coil when the first housing is in a second orientation.

In some embodiments, the first flexible connection is configured to be removably connected to the first housing and the second housing.

In some embodiments, either of the first coil or the second coil of the first housing functions as a receiver coil to wirelessly receive power from a transmitter configured as a third housing including a first coil, a second coil, and a third control logic to control the functioning of the first and second coil of the third housing.

In some embodiments, either of the first coil or the second coil of the first housing functions as a transmitter coil to wirelessly transfer power to an electronic device configured as a third housing including a first coil, a second coil, and a third control logic to control the functioning of the first and second coil of the third housing.

In some embodiments, the first housing and the second housing are configured to simultaneously wirelessly transmit power to an electronic device, simultaneously receive power from a transmitter, and receive and transmit the power simultaneously.

In some embodiments, the method further includes providing a third housing comprising a first coil, a second coil, a battery, and a third control logic to control the functioning of the first and second coil of the third housing depending on an orientation of the third housing, wherein each of the first coil and the second coil of the third housing can function as both a receiver coil and transmitter coil and physically linking the third housing with the second housing via a second flexible connection.

According to another aspect, embodiments relate to a charging system. The system includes a first housing comprising a first coil, a second coil, and a first control logic to control the functioning of the first and second coil of the first housing depending on an orientation of the first housing, wherein each of the first coil and the second coil of the first housing can function as both a receiver coil and a transmitter coil, a second housing comprising a first coil, a second coil, and a second control logic to control the functioning of the first and second coil of the second housing depending on an orientation of the second housing, wherein each of the first coil and the second coil of the second housing can function as both a receiver coil and a transmitter coil, and a first flexible connection physically linking the first housing and the second housing.

In some embodiments, each of the first housing and the second housing include a rechargeable battery, and the first flexible connection is an electrically wired connection between the first housing and the second housing such that the first control logic of the first housing and the second control logic of the second housing can permit power to be transferred between the batteries of the first and second housings.

In some embodiments, at least one of a coil of the first housing and a coil of the second housing are configured to function as a receiver coil to wirelessly receive power from a transmitter.

In some embodiments, at least one of a coil of the first housing and a coil of the second housing are configured to function as a transmitter coil to wirelessly transmit power to at least one electronic device. In some embodiments, at least one of the first coil of the first housing and the first coil of the second housing are configured to function as a receiver coil to wirelessly receive power from a transmitter simultaneously with at least one of the second coil of the first housing and the second coil of the second housing wirelessly transmitting power to at least one electronic device.

In some embodiments, the system further includes a third housing comprising a first coil, a second coil, and a third control logic to control the functioning of the first and second coil of the third housing depending on an orientation of the third housing, wherein each of the first coil and the second coil of the third housing can function as both a receiver coil and a transmitter coil, and a second flexible connection physically linking the second housing and the third housing. In some embodiments, each of the first, second, and third housings are configured to be stacked on top of each other such that a bottom housing of the stack can wirelessly receive power from a transmitter and provide power to at least one of the other housings. In some embodiments, a top housing of the stack is configured to wirelessly provide power to an electronic device. In some embodiments, the top housing of the stack is configured to wirelessly provide power to the electronic device simultaneously with the bottom housing of the stack wirelessly receiving power from the transmitter.

In some embodiments, each of the first housing, the second housing, and the third housing are configured to be positioned on a surface simultaneously, wherein at least one of the first housing, the second housing, and the third housing are configured to wirelessly receive power from a transmitter when on the surface. In some embodiments, at least one of the first, second, and third housings are configured to wirelessly receive power from the transmitter, and further configured to provide power to at least one other housing. In some embodiments, at least one of the first, second, and third housings are configured to wirelessly provide power to an electronic device simultaneously with at least one of the first, second, and third housings wirelessly receiving power from the transmitter.

In some embodiments, the first control logic of the first housing is configured to control the first coil of the first housing to function as a receiver coil and the second coil of the first housing to function as a transmitter coil when the first housing is in a first orientation and control the first coil of the first housing to function as a transmitter coil and the second coil of the first housing to function as a receiver coil when the first housing is in a second orientation.

In some embodiments, the first flexible connection is a removable connection.

In some embodiments, the system further includes a protrusion configured with at least one of the first and second housings to selectively support another housing or electronic device.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
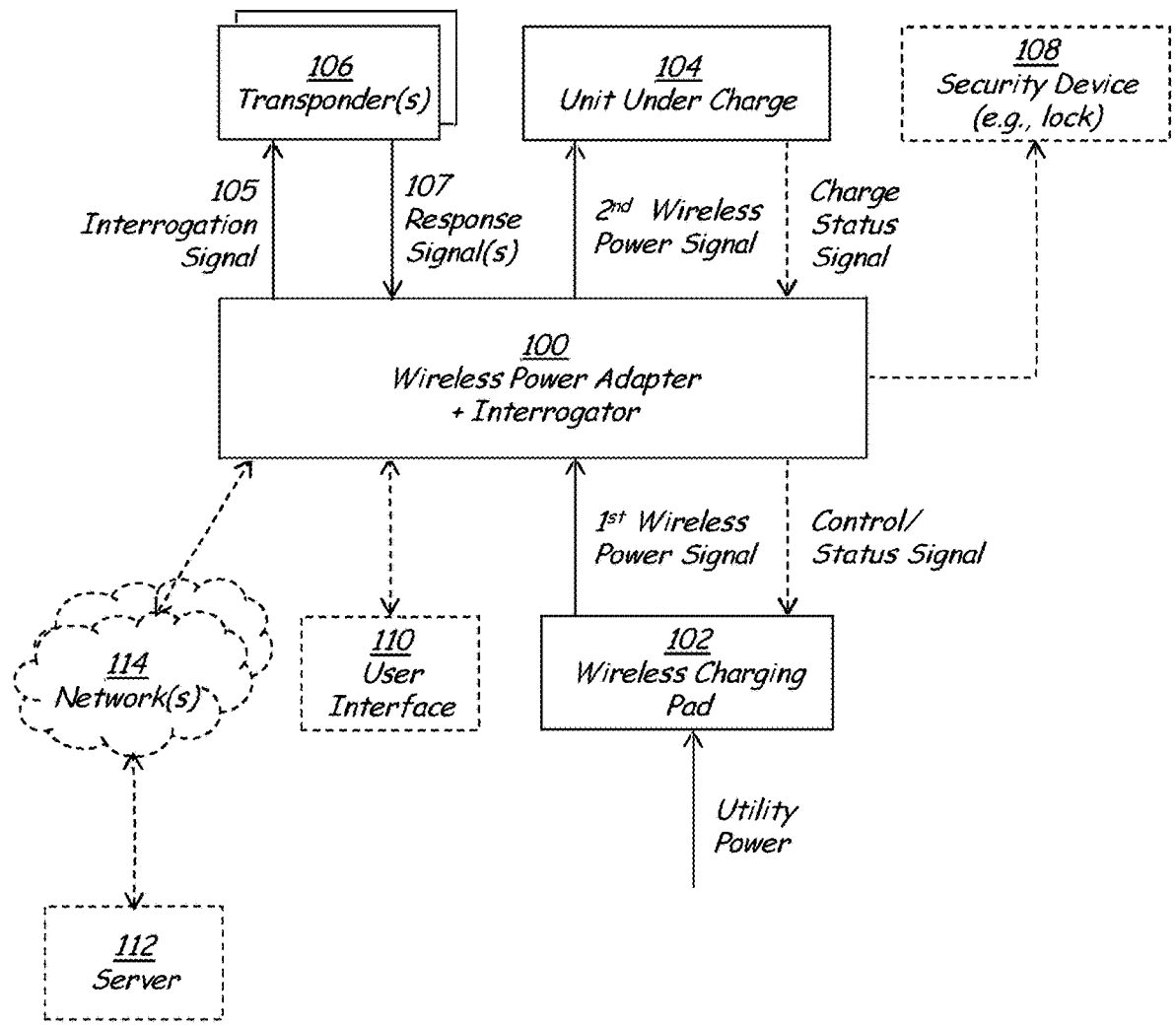
FIG. 1 shows a functional block diagram of a combined wireless charger-and-interrogator in accordance with embodiments of inventive matter disclosed herein.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The subject disclosure describes, among other things, illustrative embodiments of wireless interrogation and wireless charging of electronic devices. Other embodiments are included in the subject disclosure.

One embodiment of the subject disclosure includes a wireless charger having a housing containing a wireless power-receiving device. The wireless power-receiving device includes receive circuitry and a receive coil located within the housing. The wireless charger also contains a separate wireless power-transmitting device including transmit circuitry and a transmit coil, also located within the housing. The power-handling controller includes electronic hardware connecting the receive circuitry with the transmit circuitry to transfer the power received by the wireless power-receiving device to the wireless power-transmitting device. The wireless charger also includes interrogation circuitry in communication with the transmit coil. The interrogation circuitry includes signal transmitting circuitry to cause the transmit coil to generate a wireless interrogation signal. The interrogation circuitry also includes signal-receiving circuitry to obtain information from a wireless interrogation response signal in response to the transmit coil receiving the wireless interrogation response signal. The wireless charger is capable of simultaneously receiving power wirelessly and transmitting the power wirelessly from the power-transmitting device outside of the wireless charger. The wireless charger is also capable of accomplishing at least one of transmitting the wireless interrogation signal and obtaining the information from the wireless interrogation response signal.

Another embodiment of the subject disclosure includes a process that includes receiving a first wireless power signal by way of a power-receiving coil. A transmitting coil-drive current is generated responsive to the receiving of the first wireless power signal. A second wireless power signal is generated by way of a power-transmitting coil, in response to the generating of the transmitting coil-drive current. A wireless interrogation signal is transmitted by way the power-transmitting coil, to cause a transponder to generate a wireless interrogation reply signal. The wireless interrogation reply signal is received by way of the power-transmitting coil.

Yet another embodiment of the subject disclosure includes a wireless-charging system, including a power-receiving coil. The power-receiving coil generates an electrical current in response to a first wireless power signal. Power conversion circuitry is coupled to the power-receiving coil to convert the electrical current to a coil-driving current. A power-transmitting coil is coupled to the power conversion circuitry to transmit a second wireless power signal responsive to the coil-driving current. The power-transmitting coil is also configured to transmit an interrogation signal to cause a transponder to generate a wireless reply signal, and to receive the wireless reply signal. A controller is provided in communication with the power-transmitting coil. The controller includes a memory to store computer instructions and a processor in communication with the memory. The processor, responsive to executing the computer instructions, performs operations including determining from the wireless reply signal that the transponder is proximate to the power-transmitting coil.

In accordance with particular embodiments of inventive matter disclosed herein, combined wireless charger-and-interrogators are provided. Generally, these combined wireless charger-and-interrogators comprise both a wireless power-receiving device and a wireless power-transmitting device, although some embodiments can include a wireless power-transmitting device without necessarily having a wireless power-receiving device. The wireless power-transmitting device provides a wireless power signal suitable for supplying electrical power wirelessly to another unattached electrically powered device, as may be useful for providing power to allow for operation of the other device. Having both a wireless power-receiving device and a wireless power-transmitting device allows the wireless chargers to simultaneously receive power from an unattached electrical power source and to transmit power derived from the unattached electrical power source to the unattached electrical device.

The wireless interrogators can communicate wirelessly with other unattached wireless communication devices, such as near-field communication devices and transponders, including radio frequency identification (RFID) transponders, sometimes referred to as "tags." Unattached wireless communication devices, or transponders, can provide wireless reply signals in response interrogation by wireless interrogation signals provided by the wireless interrogators. In at least some embodiments, wireless power transmissions of the wireless chargers are adjusted in response to such responses to wireless interrogation signals. As disclosed herein, various other features can be controlled in response to one or more of the wireless interrogation or the wireless power charging.

The wireless chargers can include controllers that are capable of controlling one or more aspects of a transfer power received by the wireless power-receiving devices to the wireless power-transmitting devices. The controllers can also be configured to cooperate with the wireless interrogators, for example, by originating interrogation messages, by interpreting responses to the interrogation messages, or by controlling aspects associated with the transfer of power in response to such interrogation responses. In at least some embodiments, the wireless chargers also include housings that contain the components, modules, and/or subsystems of the wireless chargers. The housings allow the wireless chargers to be portable. In particular embodiments, the wireless chargers can comprise additional components and features as described herein.

FIG. 1 shows a diagram of an example combined wireless charger-and-interrogator in accordance with embodiments of inventive matter disclosed herein. A combined wireless charger-and-interrogator 100 receives a first wireless power signal from another unattached wireless charging device, such as a wireless charging pad 102. The wireless charging pad 102 can receive electrical power from a suitable power source, such as facility power originating from a utility power provider, from a battery, and/or from local power generation. The combined wireless charger-and-interrogator 100 transmits a second wireless power signal to an unattached device or unit to be charged, sometimes referred to as a unit under charge 104, particularly when engaging in wireless power charging. The second wireless power signal is configured to provide sufficient electrical power to allow for operation of the unit under charge 104. For example, the second wireless power signal can be used to charge a power storing device, such as a battery, of the unit under charge 104, which, in turn, provides electrical power to the unit under charge 104.

The combined wireless charger-and-interrogator 100 also transmits a wireless interrogation signal 105. The wireless interrogation signal 105, when intercepted by a transponder 106 within wireless range of the wireless interrogation signal 105, causes the transponder 106 to emit a wireless response signal 107. The transponder 106 can be attached to or integral with the unit under charge 104. Alternatively or in addition the transponder 106 can be separate from the unit under charge 104, for example being placed on another person or movable object. The combined wireless charger-and-interrogator 100 receives the wireless response signal 107. Wireless response signals 107 from the transponders 106 typically provide a means of identification, such as an identification code that may, in some instances, be unique. Such identification codes allow the combined wireless charger-and-interrogator 100 to distinguish wireless reply signals 107 from multiple transponders 106 or RFID tags. In at least some embodiments the interrogation signal and response signals occur during the wireless charging of the unit under charge 104.

A user interface 110 can be provided in combination with, or integral to, the combined wireless charger-and-interrogator 100. The user interface 110 can be used, for example, in operating, configuring, and/or maintaining the combined wireless charger-and-interrogator 100. The user interface 110 can include a user entry device such as keyboards, keypads, touchscreens, pointing devices and the like and user feedback devices, such as alphanumeric displays, graphical displays, indicator lights, audio alerts and the like.

The combined wireless charger-and-interrogator 100 can also include one or more communication interfaces, such as a telecommunication interface and/or a network interface allowing communication with remote devices such as a remote server 112 through one or more networks 114. The server 112 can be configured to support one or more aspects of operation of the combined wireless charger-and-interrogator 100 and/or operation of other features in response to operation of the combined wireless charger-and-interrogator 100. In some embodiments, the server 112 can include one or more applications, such as any of the example applications disclosed herein.

In some embodiments the combined wireless charger-and-interrogator 100 is in communication with one or more other devices such as a security device 108. The security device 108 can include a locking mechanism that is monitored and/or control by the combined wireless charger-and-interrogator 100. The security device 108 can be physically coupled to the combined wireless charger-and-interrogator 100, for example by a wire harness or cable. Alternatively or in addition, the security device 108 can be wirelessly coupled to the combined wireless charger-and-interrogator 100, for example, by a wireless communication link. Such wireless communication links can include IEEE.802.11 compliant wireless links, such as Wifi®, Bluetooth®, etc. In some embodiments, the security device 108 is communicatively coupled to the combined wireless charger-and-interrogator 100 by a network, such as a local area network, e.g., Ethernet, or a wide area network, such as a telecommunications network, and/or the Internet. The security device 108, or locking mechanism, can be controlled to selectively block or unlock according to interrogation response signals, charge status signals, external signals received via the network interface or combinations of such signals.

Figure 2:
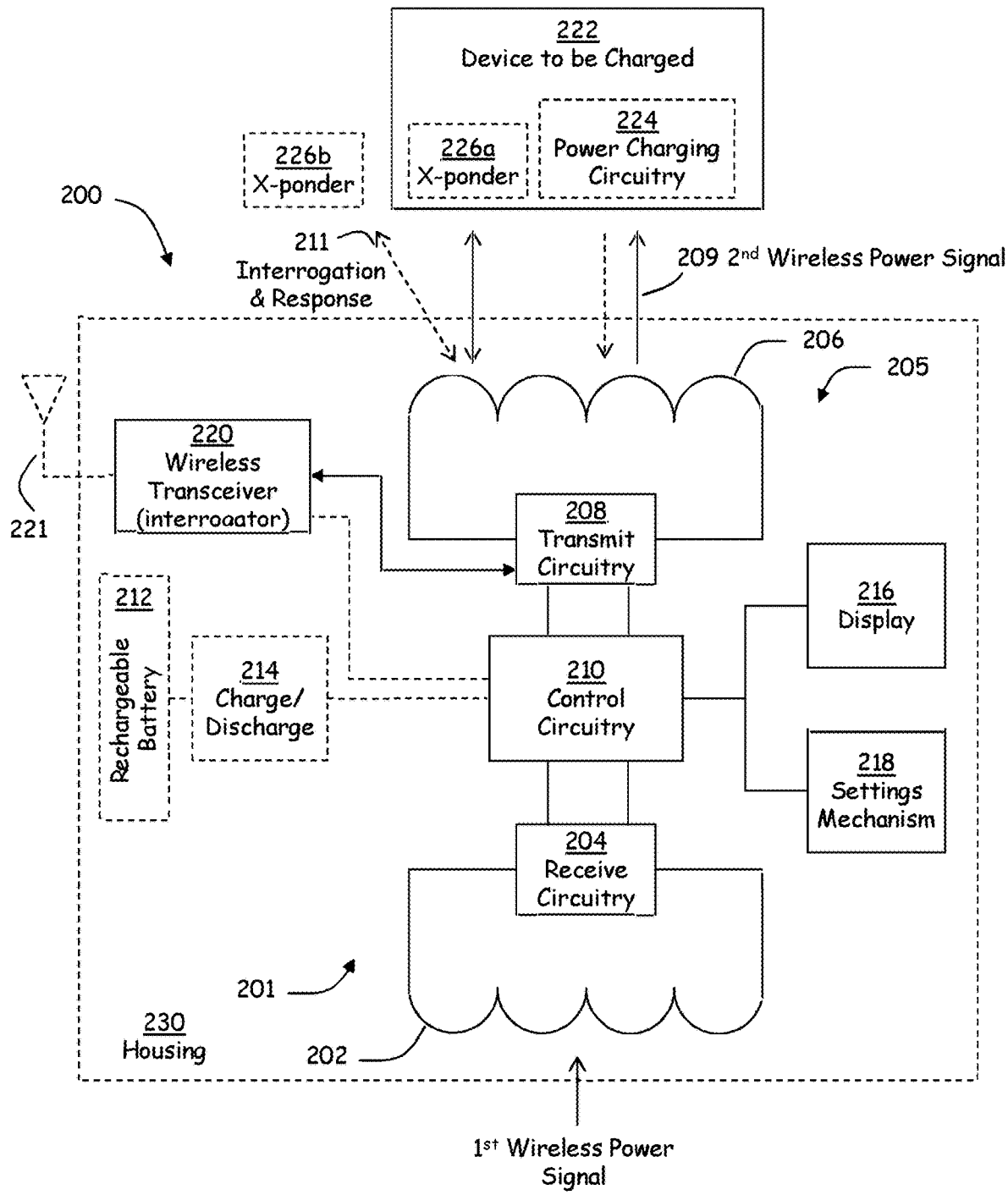
FIG. 2 shows a schematic diagram of a combined wireless charger-and-interrogator in accordance with embodiments of inventive matter disclosed herein.

FIG. 2 shows a schematic diagram of an example combined wireless charger-and-interrogator 200 in accordance with embodiments of inventive matter disclosed herein. The combined wireless charger-and-interrogator 200 includes wireless power-receiving device 201 including a receive coil 202 and receive circuitry 204. Wireless power-receiving devices 201 useful in the combined wireless charger-and-interrogator 200 can be manufactured and used in accordance with technology known in the art for producing wireless power-receiving devices. For example, the receive circuitry 204 can rectify an alternating voltage induced in the receive coil 202 by a first wireless power signal resulting in a substantially constant, notwithstanding ripple, or direct current voltage.

Analogously, a wireless power-transmitting device 205 can include a transmit coil 206 and transmit circuitry 208. Wireless power-transmitting devices useful in the combined wireless charger-and-interrogator 200 can also be manufactured and used in accordance with technology known in the art for producing wireless power-transmitting devices. For example, the transmit circuitry 208 can produce an alternating voltage and/or current, having a predetermined frequency, amplitude, duty cycle, etc., from a voltage and/or current, including direct current or substantially constant values of voltage and/or current supplied to the transmit circuitry 208 during operation of the combined wireless charger-and-interrogator 200 and supply the produced alternating voltage to the transmit coil 206. Also by way of example, the transmit circuitry 208 can produce a predetermined level of intensity of an inductive and/or radiated field of the transmit coil 206. The inductive and/or radiated field of the transmit coil 206 gives rise to a second wireless power signal 209.

An unattached electronic device-to-be-charged 222 can be positioned with a wireless range of the combined wireless charger-and-interrogator 200. When so positioned, the device-to-be-charged 222 can derive electrical power from the second wireless power signal 209. For example, the electronic device-to-be-charged 222 can be configured to include or be combined with power-charging circuitry 224 adapted to convert an intercepted portion of the second wireless power signal 209 into usable electrical power as may be used to operate the device 222 or charge a power storage device, such as a battery, to provide such electrical power for operation of the device 222.

The combined wireless charger-and-interrogator 200 includes a wireless transceiver 220. The wireless transceiver is in communication with the wireless power transmitting device 205, for example, through one or more of the transmit circuitry 208 and the transmit coil 206. The wireless transceiver or interrogator 220 generates an interrogation signal. The interrogation signal causes the wireless power transmitting device 205 to emit a wireless interrogation signal 211. The wireless interrogation signal 211 when intercepted by one or more transponders 226a and/or 226b, causes the one or more transponders 226a, 226b to respectively emit a wireless reply signal. In at least some embodiments the wireless reply signal is intercepted by the transmit coil 206 of the wireless power transmitting device 205 and/or separate antenna 221 (shown in phantom). The intercepted wireless reply signal can be routed to a receiver portion of the wireless transceiver 220, for example, through the transmit circuitry 208. Being so configured the wireless transceiver 220 of the combined wireless charger-and-interrogator 200 can interrogate remote, unattached transponders 226a, 226b using the common transmit coil 206. It is envisioned that in at least some embodiments the wireless transceiver 220 can communicate with remote transponders 226a and/or 226b by way of a separate coil and/or antenna in combination with or instead of the transmit coil 206.

The control circuitry 210 of the combined wireless charger-and-interrogator 200 can be configured to control operation of the combined wireless charger-and-interrogator 200 as described herein. The control circuitry 210 can comprise hardware alone (e.g., circuitry) or can include both hardware and software. The control circuitry 210 can be implemented by one of ordinary skill in the electronic arts without undue experimentation using technology that is known in the art. This technology can include, for example, application specific integrated circuits (ASICS), a microprocessor executing code that is designed to implement one or more of the functions and methods described herein, programmable logic arrays, digital signal processors, etc. Examples of control circuitry 210 are disclosed in U.S. Pat. No. 8,193,764, incorporated herein by reference in its entirety.

The control circuitry 210 can be in electrical communication between the wireless power receiving device 201 and the wireless power transmitting device 205 and configured to transfer electrical power wirelessly received by the wireless power-receiving device 201 to the wireless power-transmitting device 205. In some embodiments, the control circuitry 210 can transfer electrical power directly from the wireless power-receiving device 201 to the wireless power-transmitting device 205. For example, the control circuitry 210 can supply the transmit circuitry 208 with direct current voltage and/or current provided to the control circuitry 210 from the receive circuitry 204.

In particular embodiments, the combined wireless charger-and-interrogator 200 can additionally comprise a rechargeable battery. For example, the combined wireless charger-and-interrogator 200 includes a rechargeable battery 212 and charge/discharge circuitry 214. The control circuitry 210 can transfer power received wirelessly by the wireless power-receiving device to the rechargeable battery 212 instead of transferring the power directly to the wireless power-transmitting device. The combined wireless charger-and-interrogator 200 includes charge/discharge circuitry 214 in communication with the rechargeable battery 212 and the control circuitry 210 that controls the charging and discharging of the rechargeable battery 212. When the rechargeable battery 212 is charged, the control circuitry 210 can transfer power from the rechargeable battery 212 to the wireless power-transmitting device. For example, the control circuitry 210 can supply the transmit circuitry 208 with direct current voltage provided to the control logic 210 by the charge/discharge circuitry 214.

In particular embodiments, the combined wireless charger-and-interrogator 200 can include other features and components, such as a display mechanism 216 for providing a user with an indication of the operating status of the wireless charger and a settings mechanism 218 providing a user of the wireless charger with ability to select parameters for the operation of the combined wireless charger-and-interrogator 200 as disclosed herein.

In particular embodiments, the control circuitry 210 is capable of operating the wireless power-transmitting device of the combined wireless charger-and-interrogator 200 to wirelessly transmit power in accordance with a selectable power-transmitting protocol. These embodiments are referred to herein as programmable embodiments. In particular embodiments, the power-transmitting protocol is selected by a user of the combined wireless charger-and-interrogator 200. In particular embodiments, the power-transmitting protocol can be selected by the electronic device to be charged 222.

In particular embodiments, a selectable power-transmitting protocol can include, for example, a particular frequency at which the transmit circuitry 208 produces an alternating voltage that the transmit circuitry 208 supplies to the transmit coil 206. Thus, selecting a first power-transmitting protocol can cause the transmit circuitry 208 to produce an alternating voltage at a particular frequency and selecting a second power-transmitting protocol may cause the transmit circuitry 208 to produce and alternating voltage at a different frequency. Analogously, a particular power-transmitting protocol may include, for example, a particular level of intensity of an inductive field for the transmitting coil 206. Thus, selecting a first power-transmitting protocol may cause the transmit circuitry 208 to produce a particular level of intensity of the inductive field, whereas selecting a second power-transmitting protocol may cause the transmit circuitry 208 to produce a different level of intensity for the inductive field. Other aspects of any such power-transmitting protocol can include, without limitation, frequency, duty cycle, pulse shape, pulse position, quality, or Q factor, inductance, tolerances of any of such features, such as Q tolerance or inductance tolerance, etc. It is understood that one or more aspects of any of the wireless transfer protocols discussed herein can be defined or otherwise specified in one or more standards, or otherwise identified, for example, by such organizations as the Alliance for Wireless Power (http://www.a4wp.org/), and Qi, a standard for wireless charging promoted by the Wireless Power Consortium (http://www.wirelesspowerconsortium.com).

In particular embodiments, the wireless interrogator 220 including a wireless communication device can be used to identify one or more power-transmitting protocols for the electronic device to be charged 222. By way of illustrative example, the electronic device to be charged 222 includes a transponder 226a, such as in RFID tag. In response to wireless interrogation, the RFID tag 226a provides a wireless reply signal encoded with an identification code. In some embodiments, identification code includes a field that identifies one or more power transmitting protocols suitable for use with the device to be charged 222. In particular embodiments, the received information may be a single numeric value that the control circuitry recognizes as being associated with a particular power-transmitting protocol. In other embodiments, the received information may include values that correspond to parameters of a power-transmitting protocol, such as the frequency of alternating voltage and the intensity of the inductive field as discussed above. Alternatively or in addition, the identification code can be used to identify such suitable power transmitting protocols by reference, e.g., using a lookup table.

Alternatively or in addition, the control circuitry 210 is capable of associating a selectable button of the settings mechanism 218 with a power-transmitting protocol identified by a received identification. In this manner, a user of the wireless charger 210 places an electronic device to be charged 222 within wireless range of the combined wireless charger-and-interrogator 200 and selects a power-transmitting protocol (e.g., by selecting a button) that is suited for charging the electronic device 222.

Figure 3A:
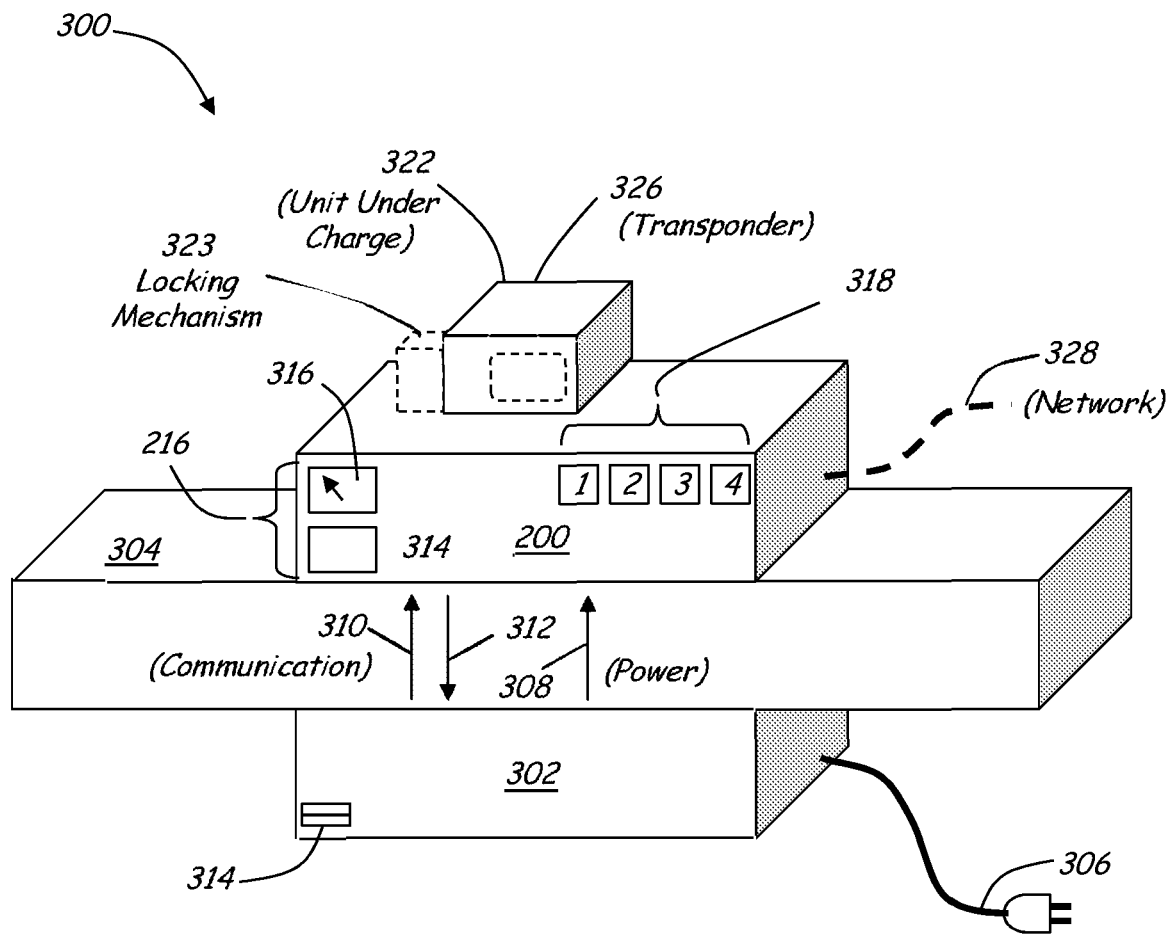
FIGS. 3A and 3B provides perspective views of a combined wireless charger-and-interrogator systems in-use, in accordance with embodiments of inventive matter disclosed herein.

FIG. 3A illustrates a perspective view of a charging system 300 utilizing the combined wireless charger-and-interrogator 200 of FIG. 2 in conjunction with another wireless charger 302 in accordance with embodiments of inventive matter disclosed herein. FIG. 3A shows a first wireless charger 302 positioned underneath a portion of a supporting platform, such as a desktop 304, with the combined wireless charger-and-interrogator 200 positioned on top of the desktop 304.

The first wireless charger 302 comprises a power cord 306 through which the first wireless charger 302 can receive conducted electrical power from a standard power source, such as a 120 Volt utility outlet commonly found in residential and office buildings or a 12 Volt source as is commonly used in the auto industry. The first wireless charger 302 is capable of wirelessly transmitting power by way of a first wireless power signal 308 through the desktop 304 to the second combined wireless charger-and-interrogator 200. The second combined wireless charger-and-interrogator 200, in turn, is capable of receiving the wirelessly transmitted power by way of the first wireless power signal 308. The wireless power-receiving device 201 (FIG. 2) of the second combined wireless charger-and-interrogator 200 can receive the wirelessly transmitted power.

In particular embodiments, the first wireless charger 302 is capable of wirelessly transmitting communications 310 and the second combined wireless charger-and-interrogator 200 is capable of receiving the wirelessly transmitted communications 310. In particular embodiments, the second combined wireless charger-and-interrogator 200 is capable of wirelessly transmitting communications 312 and the first wireless charger 302 is capable of receiving the wirelessly transmitted communications 312. The first wireless charger 302 also includes a communications port 314 (e.g., a USB port) that allows the first wireless charge 302 to be communicatively connected, for example, to a computer or directly to a network (e.g., the internet). The first wireless charger 302 can receive power-transmitting protocols via the communications port 314 and wirelessly communicate the protocols to the second combined wireless charger-and-interrogator 200 so that the second combined wireless charger-and-interrogator 200 can associate each received protocol with a selectable button, e.g., of the settings mechanism 218.

A user of the second combined wireless charger-and-interrogator 200 can charge an electronic device 322 by placing the electronic device to be charged 322 within range of the wireless power-transmitting device 205 (FIG. 2) of the combined wireless charger-and-interrogator 200. The user can accomplish this, for example, by placing the electronic device to be charged 322 on top of the combined wireless charger-and-interrogator 200. The user equipment allows the user to select a particular power-transmitting protocol for charging the electronic device 322 by allowing selection of one of the selectable buttons of the settings mechanism 318.

The second combined wireless charger-and-interrogator 200 can be portable. Thus, the combined wireless charger-and-interrogator 200 can still be used to charge electronic devices 322 even if it is removed from within range of the first wireless charger 302. For example, a user may wish to take the combined wireless charger-and-interrogator 200 with them to charge an electronic device while they are traveling. The battery indicator 314 will indicate to the user when the combined wireless charger-and-interrogator 200 itself needs to be recharged. When the user returns from traveling, the user can place the combined wireless charger-and-interrogator 200 within range of the first wireless charger 302 so that the second combined wireless charger-and-interrogator 200 can be recharged, if necessary. Since the first wireless charger 302 can be positioned out of sight on the underneath side of the desktop 304, the user can use a charging indicator 316, e.g., a light, to determine when the second wireless charge 200 is within range of the first wireless charger 302.

Figure 3B:
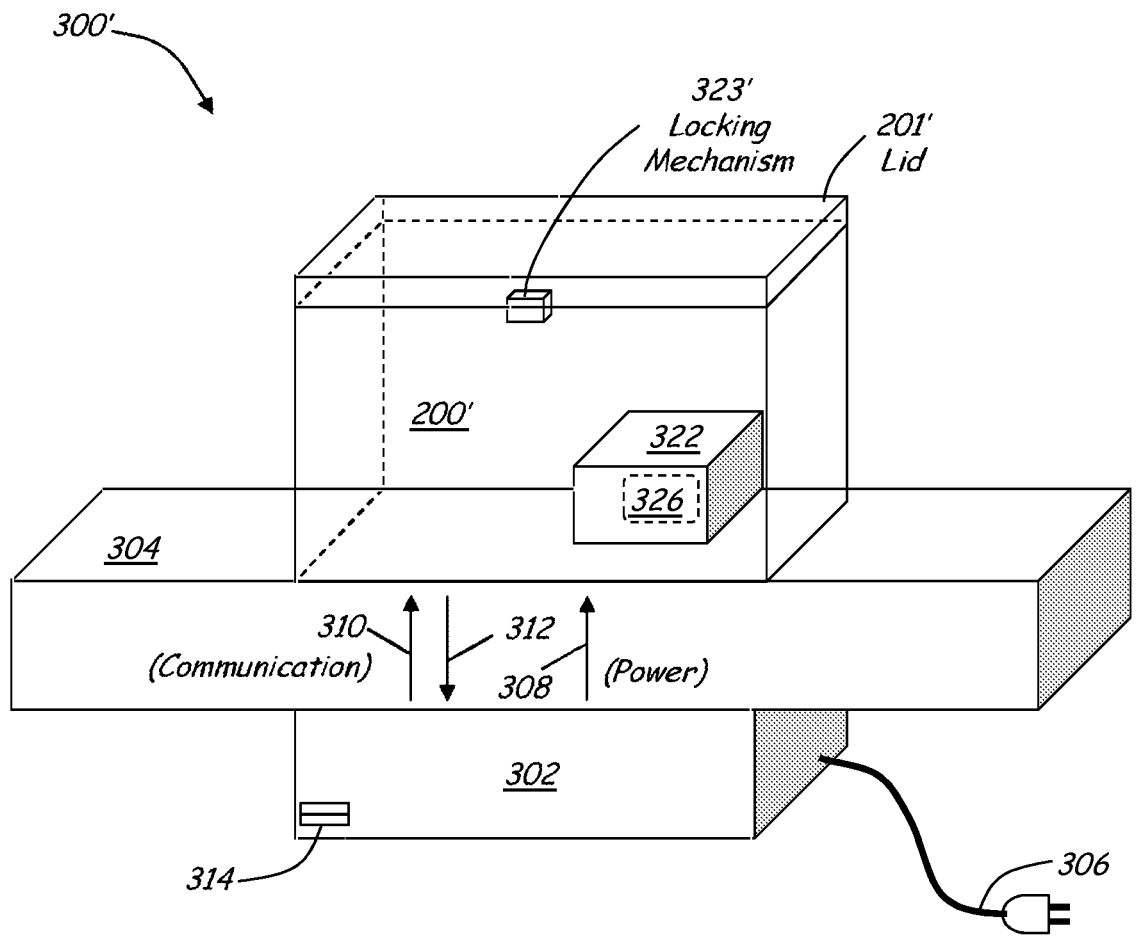

Referring next to FIG. 3B, a charger and interrogator is provided in combination with a container. The wireless charger-and-interrogator, for example, can provide container 200' by extending its housing 230 (FIG. 2) to define a relatively large cavity, or adding an extension to the housing 230 to define the cavity for holding items, such as one or more devices to be charged. In some embodiments, the wireless charger-and-interrogator 200 (FIG. 2) and container 200' are formed as an assembly. The container 200', for example, can be an open container, as in a shelf, a bin or a trough, or in the form of a closed or closeable container, such as a briefcase, a suitcase, a handbag, safe, storage locker, and the like. In the illustrative example, the container 200' includes a lid 201' that can be opened and closed. A unit to be charged can be placed into the interior cavity of the container 200', and charged by the wireless power charging signal while inside the container whether the container 200' is open, closed or locked.

In at least some embodiments, a locking mechanism 323' can be provided to allow for controllable access to the interior cavity of the container 200'. Such locking mechanism 323' can be controlled, for example, by any of the techniques disclosed herein related to security and/or operation of locking mechanisms. Alternatively or in addition, the locking mechanism 323' can be controlled by a separate device, such as a key, a key fob, and the like.

Figure 4:
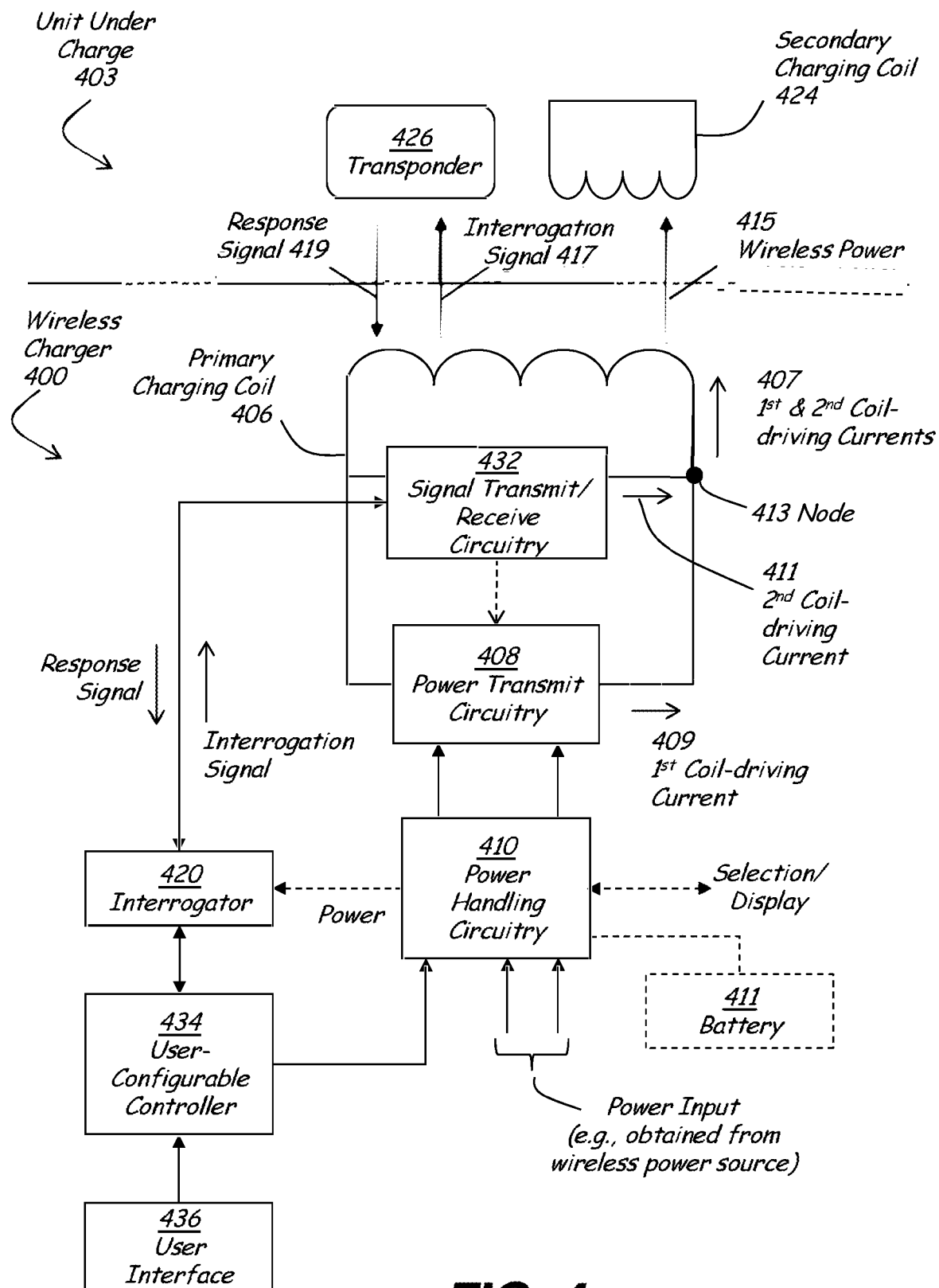
FIG. 4 shows a schematic diagram of a combined wireless charger-and-interrogator in accordance with embodiments of inventive matter disclosed herein.

FIG. 4 illustrates in more detail an embodiment of a combined wireless charger-and-interrogator device 400. The device 400 includes the primary charging coil 406. The primary charging coil 406 is energized by a coil driving current 407. The device 400 includes power transmit circuitry 408 coupled to the primary charging coil 406. In the illustrative example the power transmit circuitry 408 provides a first current portion 409 of the coil driving current. The device 400 also includes signal transmit/receive circuitry 432. In the illustrative example the signal transmit/receive circuitry 432 provides a second current portion 411 of the coil driving current. In the example configuration, the first coil driving current portion 409 and the second coil driving current portion 411 are summed at a current node 413 to form the coil driving current 407.

The device 400 includes power handling circuitry 410 coupled to the power transmit circuitry 408. In at least some embodiments, the device 400 also includes one or more batteries 411. The power handling circuitry 410 can obtain electrical power from an external source such as conducted facility power and/or a received wireless power signal. The power handling circuitry 410 can be configured to provide the first coil driving current portion 409 suitable for generating a wireless power signal 415 according to a particular wireless power protocol. The wireless power signal 415 can be intercepted by an unattached secondary charging coil 424, for example a charging coil of a device to be charged 322 (FIG. 3A). In some embodiments, the device 400 includes circuitry for charging a battery 411, when present and/or managing other aspects of battery operation, such as controlling when the battery 411 is charging, and when the battery 411 is supplying power to other circuits of the wireless power charger, e.g., when power input is not available from another source, such as another wireless power source. Such circuitry can be included within the power handling circuitry 410, as illustrated, or provided by one or more other circuits or modules, either alone or in combination with the power handling circuitry 410.

In at least some embodiments the device 400 includes a user configurable controller 434. The user configurable controller 434 can be coupled to the power handling circuitry 410 allowing a user to control aspects of the power handling circuitry 410, such as identification of a particular wireless protocol. In order to facilitate user configuration of the user configurable controller 434, the device 400 can include a user interface 436 in communication with the user configurable controller 434.

And interrogator 420 is provided in communication with the signal transmit/receive circuitry 432. The interrogator 420 causes the signal transmit/receive circuitry 432 to generate the second coil driving current portion 411. In at least some embodiments the interrogator 420 causes the signal transmit/receive circuitry 432 to generate the second coil driving current portion 411 according to a particular interrogation protocol. The second coil driving current portion 411 causes the primary charging coil 406 to generate a wireless interrogation signal 417. The wireless interrogation signal 417 can be intercepted by an unattached transponder 426, such as a transponder 426 associated with or otherwise coupled to the unit under charge 403, such as the device to be charged 322 illustrated in FIG. 3A.

The transponder 426, when positioned within wireless range of the interrogation signal 417, produces a wireless response signal 419. The primary charging coil 406 intercepts a portion of the wireless response signal 419 when within wireless range of the wireless response signal 419. The intercepted portion of the wireless response signal 419 induces a wireless response current within the primary charging coil 406. The wireless response current can be detected by the signal transmit/receive circuitry 432. In at least some embodiments indications of the response signal detected by the signal transmit/receive circuitry 432 is routed to the interrogator 420. The interrogator 420 when provided in communication with the user configurable controller 434 can provide indications of the response signal usable by the configurable controller 434. For example the user configurable controller can be preconfigured to adjust the first coil driving current portion 409 in reaction to the response signal by way of the power handling circuitry 410 and the power transmit circuitry 408. Such adjustments can include one or more of activation of the power transmit circuitry 408 to produce the first coil driving current portion 409, deactivation of the power transmit circuitry 408 to terminate the first coil driving current portion 409, adjustment of the power transmit circuitry 408 to increase and or decrease the first coil driving current portion 409.

Figure 5A:
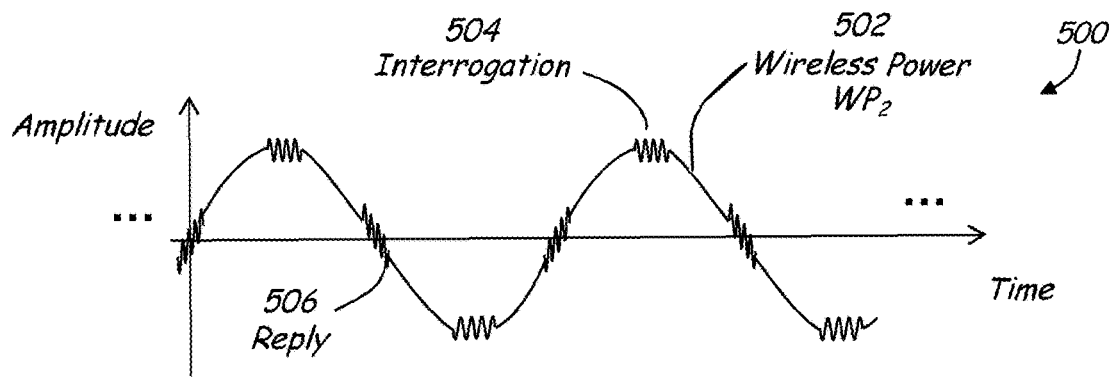
FIGS. 5A and 5B illustrate waveforms of alternative forms of wireless signals provided by a combined wireless charger-and-interrogator in accordance with embodiments of inventive matter disclosed herein.

FIG. 5A illustrates an example of a waveform 500 of the composite coil driving current 407 (FIG. 4). In the illustrative example, the coil driving current waveform 500 includes a first portion 502 to indicative of the first coil driving current 409 (FIG. 4). In the illustrative example, the first portion 502 to includes a first sine wave having a relatively large amplitude and a relatively large period. The coil driving current waveform 500 also includes a second portion 504 indicative of the second coil driving current 411 (FIG. 4). In the illustrative example, the second portion 504 includes a second sine wave having a relatively small amplitude in a relatively short period. In particular, the resulting waveform 500 includes the second portion 504 superimposed upon the first portion 502. A transponder, such as an RFID transponder can include one or more frequency-selective circuit elements, such as filters, e.g., tank circuits, to differentiate detection of a wireless signal related to the second portion 504 in the presence of a wireless signal related to the first portion 502. Such a waveform can be obtained by modulating the wireless power signal according to the wireless transponder signal. One or more of any suitable forms of modulation can be used as otherwise generally known.

The particular waveform 500 is provided for illustrative purposes only and should not be limiting to the possible waveforms and combinations of waveform parts. For example one or more of the first and second portions 502, 504 can include other shapes such as rectangular, triangular, trapezoidal, cosine squared, linear, and the like. Additionally the relative periods of the first and second portions 502, 504 can be greater or shorter without limitation that one portion be greater or shorter than the other portion. Nor is there any limitation whether either of the first and second portions 502, 504 a continuous, discontinuance, uniform, or otherwise. It is conceivable that in at least some embodiments the waveform 500 includes a third portion 506 indicative of a primary charging coil current induced by interception of a wireless response signal 419 (FIG. 4).

Figure 5B:
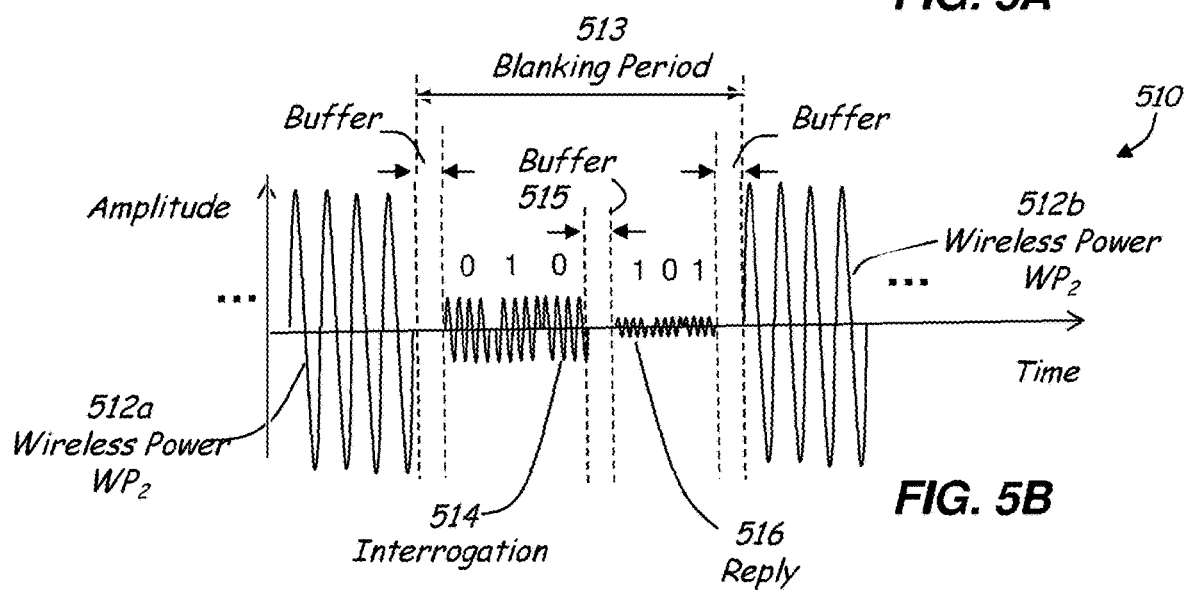
Figure 5C:
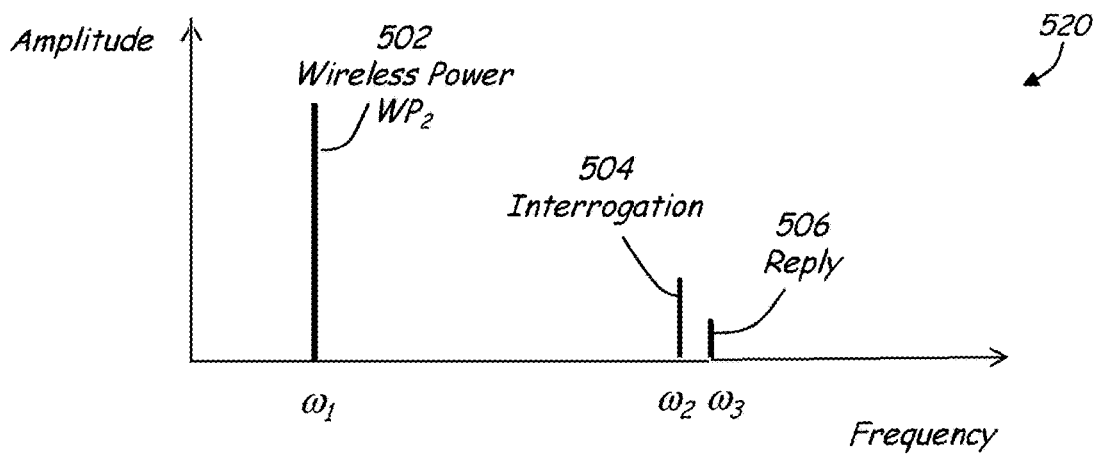
FIG. 5C illustrates a frequency spectrum of the wireless signal described by the waveform of FIG. 5A.

FIG. 5 B illustrates another example of a waveform of the composite coil driving current 407 (FIG. 4). In the illustrative example, the coil driving current waveform 510 includes a first portion 512a, 512b, generally 512 indicative of the first coil driving current 409 (FIG. 4). In the illustrative example, the first portion 512 includes a first sine wave having a relatively large amplitude and a relatively large period. In the illustrative example, the first portion is discontinuous or otherwise divided into a first sub portion 512a and a second sub portion 512b separated by an intermediary blanking period 513—it is understood that other portions of the waveform 510 can include repeated blanking periods 513 between extended segments of wireless power signal. Such blanking periods can be characterized by a complete turn off of the first coil driving current portion 409, or a reduction of the amplitude of first coil driving current portion 409, e.g., by a factor of 2, 10, 100 or more. In at least some embodiments the waveform 510 includes a third portion 516 indicative of a primary charging coil current induced by interception of the wireless response signal 419 (FIG. 4). The reply signal of the third portion 516 is shown following the interrogation signal of the second portion 514, separated by a buffer period 515. It is understood that in at least some examples, the second portion 504 and the third portion 516 can overlap, such that the interrogation and response signals are simultaneously present. In such instances, the relative periods or frequencies of the second portion 514 and the third portion 516 can differ to allow for their separate interpretation by way of frequency selective components, such as filters and/or tank circuits. Such blanking periods can be advantageous in combination with low noise amplifiers on those portions of a transponder receiver circuit configured to receiver the wireless reply signal. As illustrated, the third portion 506 can similarly include an encoded message, such as another BPSK message encoding the digital value of "101." Although BPSK is used for illustrative purposes, it is understood that other signal encoding techniques can be included alone or in combination. By way of further example, such signal encoding techniques can include amplitude modulation, frequency modulation, phase modulation, pulse amplitude modulation, frequency shift keying, pulse position modulation, quadrature amplitude modulation, and the like.

FIG. 5 C illustrates an example of a frequency spectrum of the coil driving current waveform 500 illustrated in FIG. 5A. In particular, a first spectral component is provided at a first frequency □□1 indicative of the coil driving current portion 409 (FIG. 4) of the first portion 502. A second spectral component is provided at a second frequency □2 indicative of the second coil driving current 411 (FIG. 4) of the second portion 504. A third spectral component is provided at a third frequency □□3 indicative of the primary charging coil current induced by interception of a wireless response signal 419 (FIG. 4) of the third portion 506. In the illustrative embodiment and without limitation, □3>□2>□1.

Figure 6:
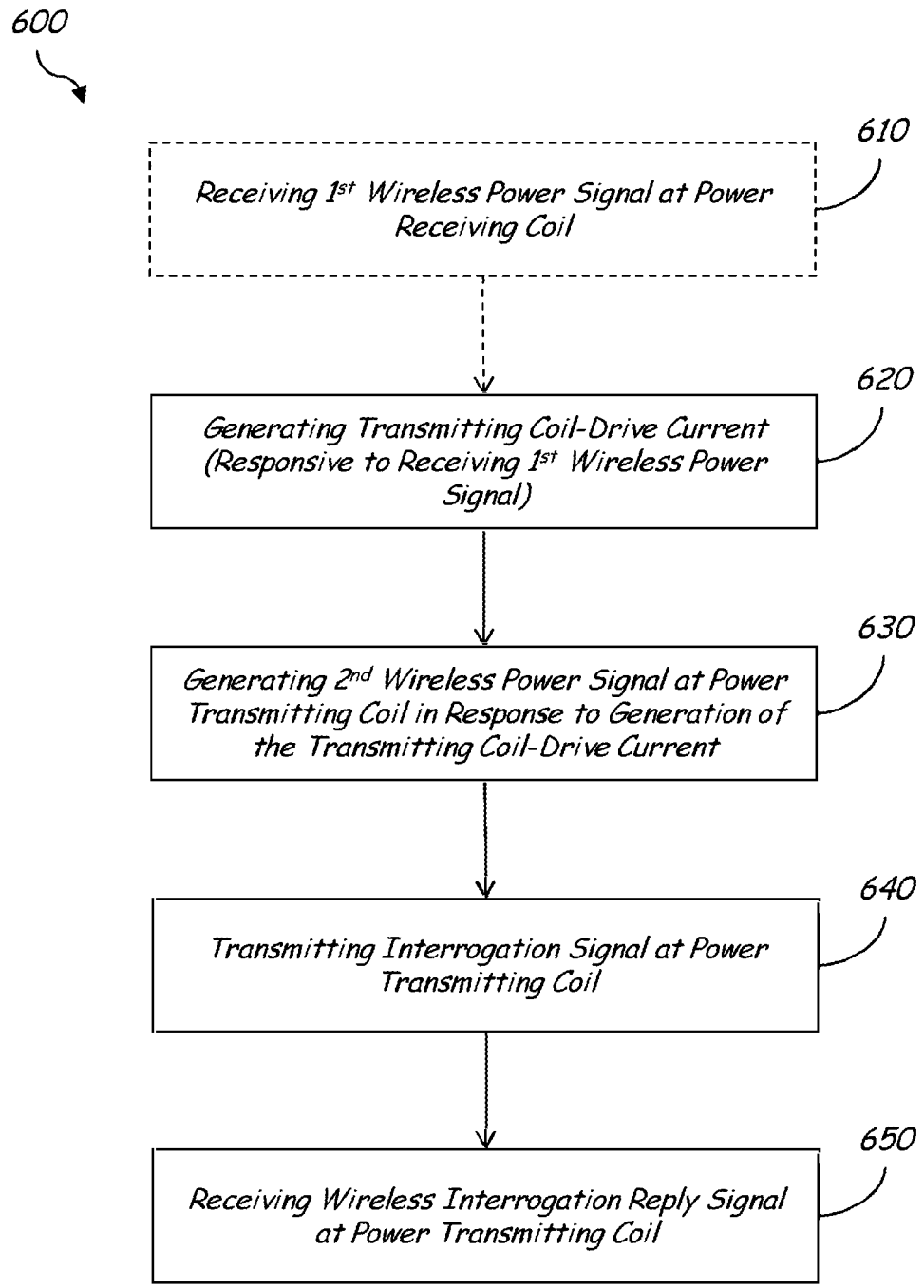
FIG. 6 illustrates operations performable by a programmable combined wireless charger-and-interrogator in accordance with embodiments of inventive matter disclosed herein.

FIG. 6 illustrates operations 600 performable by a combined wireless charger-and-interrogator in accordance with embodiments of inventive matter disclosed herein. The operations 600 comprise step 610 through step 650. In particular embodiments, the wireless charger may perform one or more steps simultaneously.

In step 610, the combined wireless charger-and-interrogator wirelessly receives power by way of a first wireless power signal at a first device located in a housing, the first device being a wireless power-receiving device. This step is shown in phantom to imply that in some embodiments in which the combined wireless charger-and-interrogator receives conducted electrical power (e.g., facility power), and/or operates from a separate power source, such as a battery source, step 610 can be omitted. It is also understood that the combined wireless charger-and-interrogator can charge one or more rechargeable batteries from other sources, including conducted electrical power and/or wireless power received in step 610, such that the charged batteries can power to allow for operation as disclosed herein without either conducted electrical power or a first wireless power signal. In step 620, the combined wireless charger-and-interrogator generates a transmitting coil-drive current. Generation of the transmitting coil-drive current is accomplished responsive to the receiving of the first wireless power signal for embodiments in which the first wireless power signal is received at a receiving coil of the combined wireless charger-and-interrogator. In step 630, the combined wireless charger-and-interrogator wirelessly transfers electrical power from the wireless power-transmitting device by way of a second wireless power signal generated in response to generation of the coil-drive current. In step 640, the combined wireless charger-and-interrogator generates a wireless interrogation signal. As disclosed herein, the wireless interrogation signal can be generated using a common coil and/or antenna as used in generation of the second wireless power signal. The wireless interrogation signal is configured to cause a transponder within wireless range of the wireless interrogation signal to generate a wireless reply signal. In step 650, the combined wireless charger-and-interrogator receives the wireless reply signal from the interrogated transponder.

Figure 7:
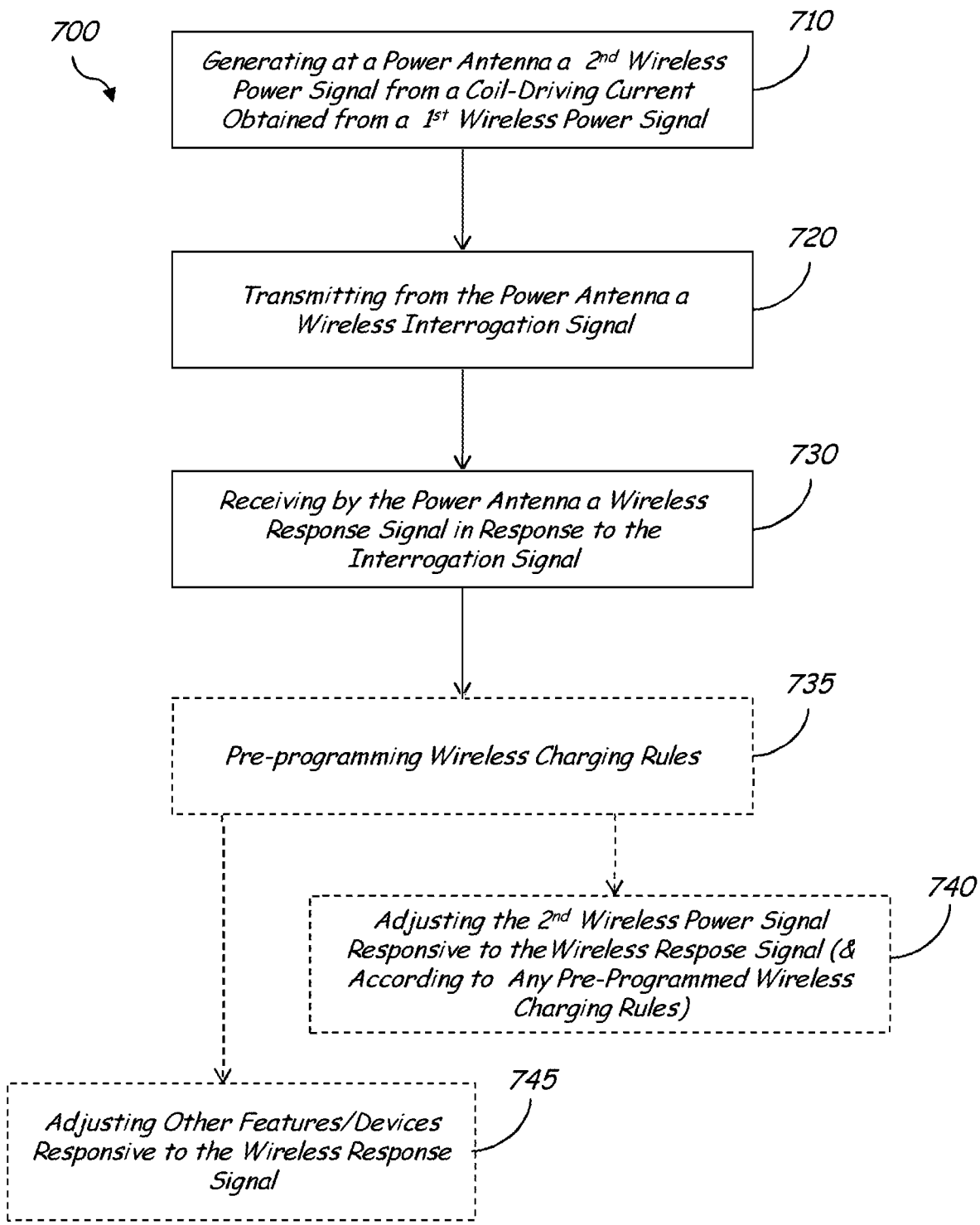
FIG. 7 illustrates operations performable by a programmable combined wireless charger-and-interrogator in accordance with embodiments of inventive matter disclosed herein.

FIG. 7 illustrates operations 700 performable by a combined wireless charger-and-interrogator in accordance with embodiments of inventive matter disclosed herein. The operations 700 comprise step 710 through step 745. In step 710 a wireless power signal is generated by way of a power-charging coil or antenna stimulated by a coil-driving current. In some embodiments the coil can be formed by one or more turns of an electrical conductor. The terms of the coil can be opened air or field at least partially with another material such as materials to promote efficient generation of electromagnetic fields. By way of example a coil filling material can include ferrite materials. Although reference is made herein to a single coil it is conceivable that an array of multiple coils can serve a similar purpose. When multiple coils are provided, they can be connected in series, in parallel, or in combinations of series and parallel arrangements. By way of example, a rectangular array of coils can be arranged to cover a surface of the combined wireless charger-and-interrogator. A device to be charged can be placed adjacent to such a rectangular array of coils. Other physical arrangements, such as non-planar arrangements, are envisioned without limitation.

In step 720, a wireless interrogation signal is generated, for example, by the power-charging coil. The wireless interrogation signal causes a transponder within a communication range of the wireless interrogation signal to generate a wireless response signal. In step 730, the wireless response signal is detected by the combined wireless charger-and-interrogator. In at least some embodiments the wireless response signal is intercepted or otherwise received by the power charging coil. In step 740 (shown in phantom), one or more features of the combined wireless charger-and-interrogator can be controlled, modified, or otherwise varied in response to the receiving of the wireless response signal of the transponder. In some embodiments, one or more rules identifying such responses can be preprogrammed for example at step 735 (shown in phantom). Examples responses and preprogramming of such responses are provided herein below, without limitation. It is understood that such rules can be used to control, modify, or otherwise vary other features of the combined wireless charger-and-interrogator and or of ancillary devices, as in step 745 (shown in phantom). Examples of such other features include without limitation security features, locking mechanisms, data recorders, image recorders, alarms, etc.

Figure 8A:
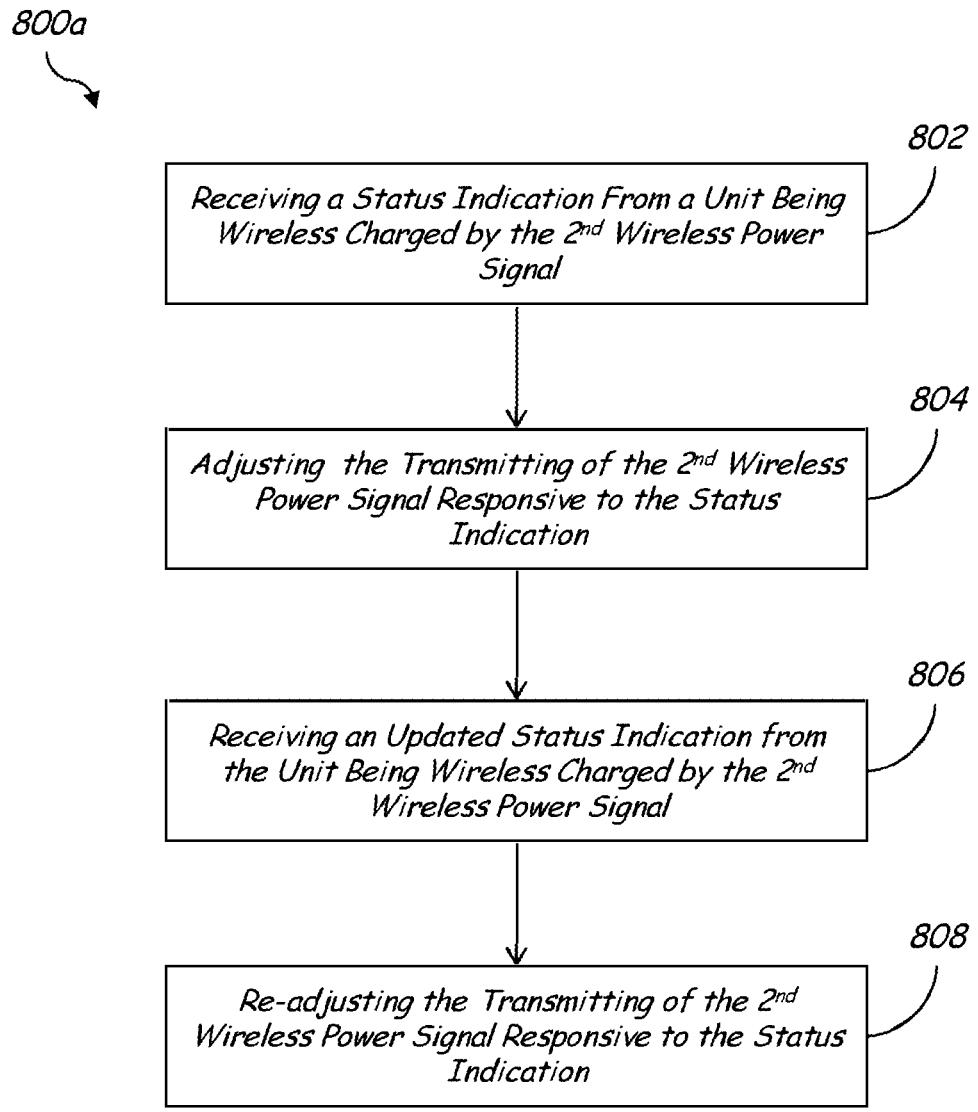
FIGS. 8A-8C illustrate operations performable by a programmable combined wireless charger-and-interrogator in accordance with embodiments of inventive matter disclosed herein.

FIG. 8A illustrates an embodiment of more detailed operations 800*a* performable by a combined wireless charger-and-interrogator in accordance with embodiments of inventive matter disclosed herein. These steps can be performed in association with either or both of steps 740 and 745 (FIG. 7). The operations 800*a* comprise step 802 through step 808. In step 802, a status indication is received from a unit to be charged and/or from a unit already under charge by the wireless power charging signal. In step 804, the generation of the wireless power-charging signal is adjusted in response to the status indication received. For example, such a status indication can include a power charge status of the unit to be charged. Thus, a status indication received in step 802 might indicate whether a unit to be charged is fully charged, has a somewhat depleted charge, or has a critically low charge.

It can be advantageous to adjust the generation of the wireless power signal in response to the particular status indication. According to the illustrative example, the combined wireless charger-and-interrogator can prevent generation of the wireless power charging signal in response to a status indication that a device about to be charged is already fully charged. Likewise, the combined wireless charger-and-interrogator can generate a wireless power charging signal in response to a status indication that the charging status of the unit about to be charged is either partially depleted or critically low. The status information can be recorded for example by a controller of the combined wireless charger-and-interrogator to support application of other preprogrammed rules. By way of example such rules may prevent wireless charging under certain circumstances, such as time of day. However such prevention of wireless charging can be overridden by a status indication that the charging status of the unit to be charged is critically low.

In step 806, updated status indications can be received from time to time for the unit to be charged or the unit currently being charged by the wireless power charging signal. In step 808, generation of the wireless power signal can be readjusted in response to any updated status indication. As in the previous example in which a preference to block charging for unit having a charge status that is critically low is overridden can be altered when the charge status of the unit has changed from critically low. For example the unit, upon achieving a minimum threshold charge, may no longer report a status of critically low charge. Noting the changes status the combined wireless charger-and-interrogator can revert to a preferred mode of operation such as prevention of charging according to the preprogrammed rules.

In some embodiments preprogramming of the wireless charging rules as in step 735 can be implemented to provide a measure of safety, for example, to guard against exposure to electromagnetic radiation as might be generated by the combined wireless charger-and-interrogator. By way of example, preprogrammed wireless charging rules can be implemented to prevent wireless charging during certain time periods in which individuals are likely to be in close proximity to the combined wireless charger-and-interrogator. Such time periods can correspond to working hours for a combined wireless charger-and-interrogator located in an office environment or evening hours and weekends for a combined wireless charger-and-interrogator located in a home environment. In operation a unit to be charged placed in close proximity to the combined wireless charger-and-interrogator will be charged at least in part according to the time and or day of the week. Thus, a combined wireless charger-and-interrogator in an office would charge if the time is after hours or if the day is a weekend.

Override features can be provided to allow charging to take place despite preprogrammed time and/or date of the week preferences. An example of such a feature would be to allow and override of a preprogrammed rule to prevent charging, upon a determination that a charging status of the unit to be charged is indicating a critically low charge. Another example of such a feature would be to allow for a manual override, such as a user accessible button on the combined wireless charger-and-interrogator. In some embodiments the wireless charger and interrogator can include in indicator, such as a light, that wireless power charging is taking place contrary to preferred schedule.

By way of further example, preprogrammed wireless charging rules can be implemented to prevent and/or promote wireless charging responsive to an interrogation of a transponder. Such transponders, e.g., RFID tags, can be carried by individuals and/or placed on personal property. When the RFID tag is close enough to be interrogated and identified by the combined wireless charger-and-interrogator it can be inferred that any individual and/or device associated with the RFID tag is likely to be in close proximity to the combined wireless charger-and-interrogator. For example, wireless charging can be disabled when an RFID tag is detected within proximity of the combined wireless charger-and-interrogator. In some embodiments RFID tags can be associated with individuals and classes of individuals as described herein. One such class of individuals can include children who may be particularly susceptible to the effects of electromagnetic radiation. Thus, an RFID tag can be placed on a child's clothing and/or the child's personal property or equipment, such as an infant carrier, toy or stroller. Other classes of individuals can include adults.

The preprogrammed rules can infer a class or classes of individuals in proximity of the combined wireless charger-and-interrogator according to interrogation replies from a transponder. For example, the combined wireless charger-and-interrogator can completely terminate wireless charging upon detection of an RFID tag associated with a child; whereas, the same combined wireless charger-and-interrogator can reduce charging to a lower power mode, such as a trickle charge, upon detection of an RFID tag associated with an adult. Additional rules can be provided for example at step 735 to allow for interaction between rules associated with RFID tags and rules associated with other aspects such as time and day of the week. Alternatively or in addition individual RFID tags can be associated with customized or preprogrammed rules irrespective of an individual, a class of individuals, an entity, and so forth.

Various power and/or charging control features are disclosed herein relate to use of the wireless charger-and-interrogator with a separate or supporting wireless power source. Examples of such supporting wireless power sources include the first wireless charger 302 (FIG. 3A), providing a first wireless power signal to power the wireless charger-and-interrogator. It is understood that any of the various power and/or charging control features disclosed herein as controlling or otherwise modifying generation of a wireless power signal by the wireless charger and interrogator, can also be used to control wireless power signal produced by the other wireless power source. Such extension of control features from the wireless charger-and-interrogator can be provided, for example, through a communications channel established between the charger-and-interrogator and the other wireless power source. An example of such a communications channel is illustrated by the communications 310 of FIG. 3A. Thus, modification of a wireless power signal for charging the device to be charged, e.g., a second wireless power signal, can also result in a modification of a wireless power signal from the other wireless power source.

Figure 8B:
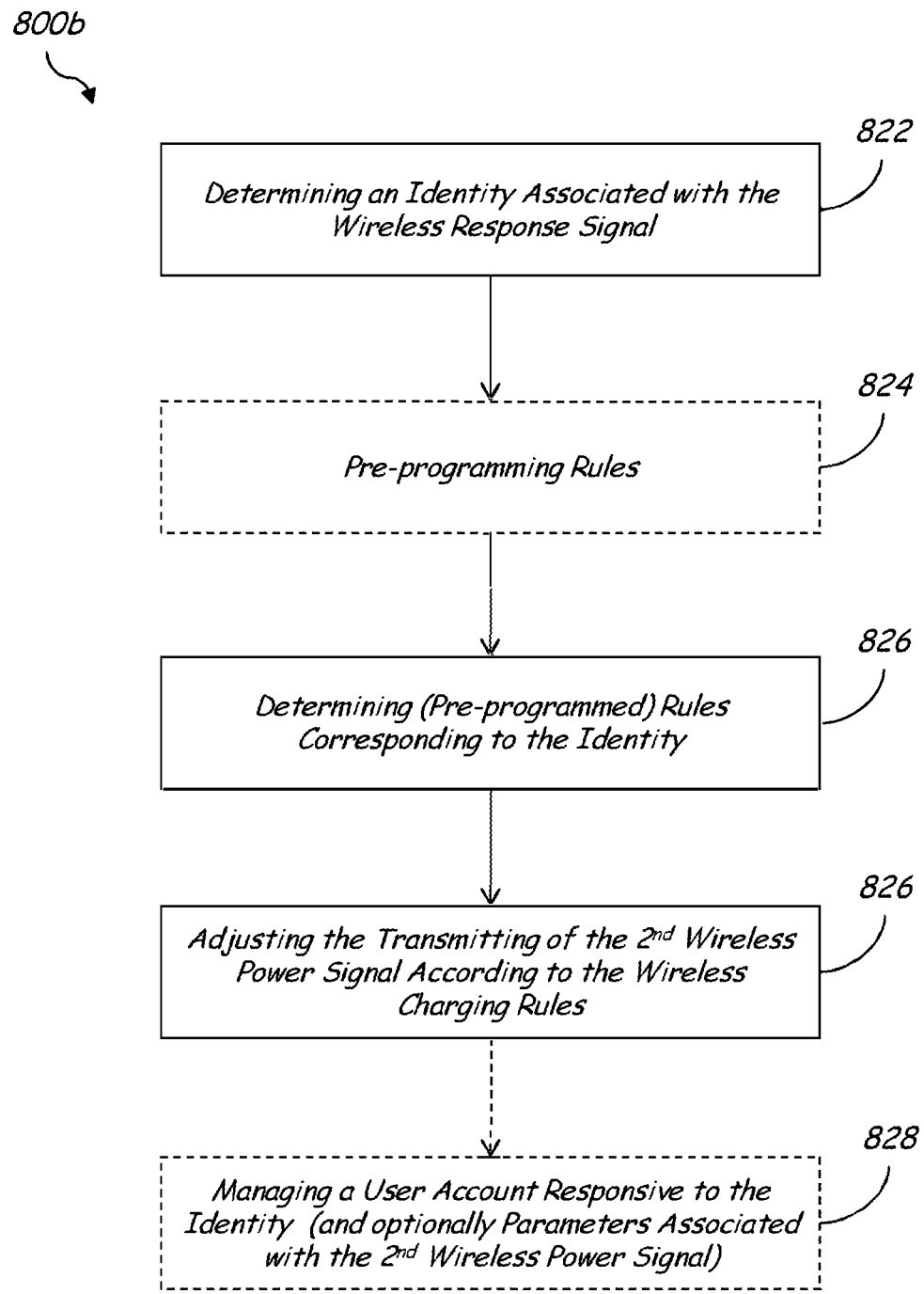

FIG. 8B illustrates another embodiment of more detailed operations 800b performable by a combined wireless charger-and-interrogator in accordance with embodiments of inventive subject matter disclosed herein. These steps can be performed in association with either or both of steps 740 and 745 (FIG. 7). The operations 800b comprise step 822 through step 828. In step 822, information is obtained from the wireless response signal. For example the information can include a means of identification such as an identification code. It is common for RFID transponders to wirelessly return a signal encoded with an identification number, such as a universal product code (UPC) and/or a unique serial number, upon interrogation. In some embodiments, one or more rules can be preprogrammed as in step 824 (shown in phantom). Such preprogrammed rules can be implemented in response to the determining of the identity associated with the wireless response signal as in step 822.

In some embodiments generation of the wireless power charging signal can be adjusted or otherwise altered according to the preprogrammed rules implemented in step 826 upon the determining of the identity associated with the response signal in step 822. By way of example and without limitation the rules corresponding to the identity in step 826 can include an authorization responsive to the determining of the identity associated with a wireless response signal in step 822.

As the transponder may be associated with an individual, a class of individuals, an entity, and the like, such authorization can be determined for the associated individual, class of individuals, entity, and so forth. Such authorizations can be preprogrammed as in step 824 to allow for managed authorization that can be configured and/or reconfigured responsive to preprogramming of the rules in step 824. Thus an individual can associate one or more identities with one or more transponders having known identification codes, such that their identities can be inferred by the detection of the identification code of the transponder in response to wireless interrogation by the combined wireless charger-and-interrogator. Transponders can be carried by an individual for example on an identification card, a key fob, or other suitable token. Alternatively or in addition, transponders can be associated with property. Some examples of property that can be identified by such transponders include electronic equipment such as computers, communication devices, entertainment devices, power tools, transportation devices, documents, briefcases, hand bags, furniture, wireless power charging harnesses, and the like.

In some embodiments a unit to be charged includes a transponder, such as an RFID tag. As the unit is placed nearby to the combined wireless charger-and-interrogator the combined wireless charger-and-interrogator interrogates the RFID tag causing the tag to generate a wireless reply. The combined wireless charger-and-interrogator receives the wireless reply from the nearby unit and interprets encoded information contained within the reply, such as an identification code of the RFID tag. The controller of the combined wireless charger-and-interrogator or a server, such as the remote server 112 illustrated in FIG. 1, can determine whether the identification code of the RFID tag is associated with an authorized individual or entity. The controller and/or server can be preprogrammed to take one or more first actions in response to a determination that the RFID tag is associated with an authorized individual or entity, and/or to take one or more second actions in response to a determination that the RFID tag is not associated with an authorized individual, or class of individuals, or entity.

For example, generation of the wireless power charging signal can be allowed in response to determination that the RFID tag is associated with an authorized individual, or class of individuals, or entity. Classes of individuals can include family members, employees, students, club members, and the like. Entities can include businesses, schools, clubs, other organizations, and the like. In at least some embodiments, authorization to access of products and/or services can be made further contingent upon one or more additional preprogrammed rules in step 824. By way of example an authorized individual can be associated with an account such as a user account, a loyalty awards account, or a prepaid account, e.g., for membership in an organization, for purchase of services, such as wireless power charging services, and the like. Such additional rules can cause the controller and/or server to consult an account status of the authorized individual and or entity. Authorization to access the products and/or services can be contingent upon first identifying the individual and/or entity as being authorized and determining an appropriate account status, such as paid up, active, and the like.

Further rules can be preprogrammed in step 824, for example, to allow the individual or entity to interact with another application, such as and account management application, as in step 828 to perform other tasks related to management of an account, etc. Thus, upon determination that an account has insufficient resources to allow access to the products or services sought by the authorized individual associated with the RFID tag, access to the corresponding account can be provided to the authorized individual or entity to allow for a replenishment of the resources in order to access the products or services sought. In some embodiments the replenishment can be automated such that upon a determination that the corresponding account has insufficient resources, the account can be automatically updated to add resources, for example, by way of a preapproved means, such as a valid credit card, or access to a bank account.

By way of further example, one or more second actions in response to a determination that the RFID tag is not associated with an authorized individual, or class of individuals, or entity can include generation of a message indicating that access to products and/or resources, such as the wireless power charging services discussed herein, is being sought by an unauthorized individual or entity. Such a message can be communicated to a remote entity, such as a remote authorization application running on the server, to a remote service provider, to security authorities such as building security or law enforcement, by way of a wired and/or wireless telecommunication network, cellular, WiFi, etc. Alternatively or in addition, the combined wireless charger-and-interrogator can provide an indication of a location associated with the attempted unauthorized access. The location can be obtained from a location determining device, such as a GPS receiver and/or from a predetermined location of the combined wireless charger-and-interrogator. In some embodiments an approximation of the location can be determined from another device, such as a wireless access point through which a wireless version of the message was sent.

Figure 8C:
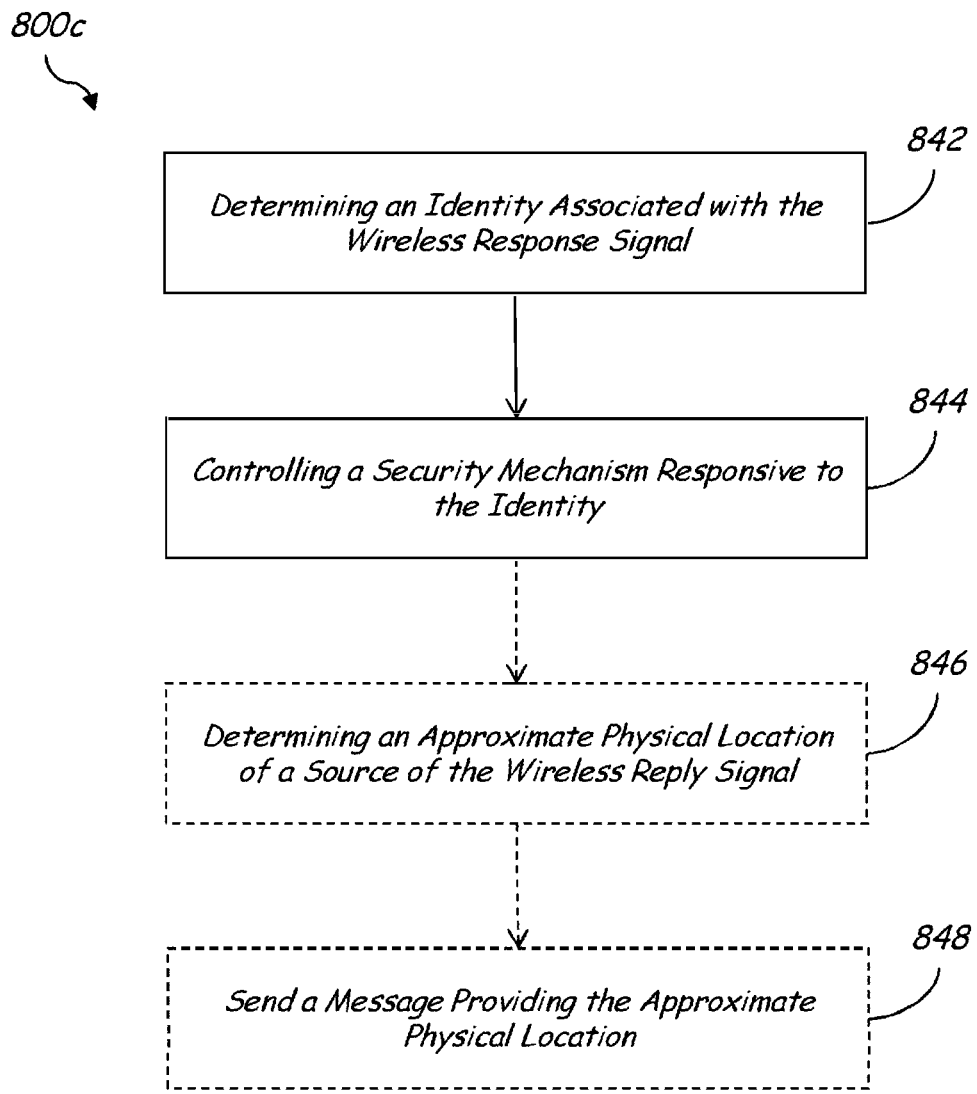

FIG. 8C illustrates another embodiment of more detailed operations 800c performable by a combined wireless charger-and-interrogator in accordance with embodiments of inventive matter disclosed herein. These steps can be performed in association with either or both of steps 740 and 745 (FIG. 7). The operations 800c comprise step 842 through step 848. In step 842, information is obtained from the wireless response signal, such as an identification code associated with a transponder that generated the wireless response signal. In step 844, a security device can be operated in response to the determining of the identity associated with the wireless response signal as in step 842. For example a security device can include a locking mechanism that can be controlled in response to the identity associated with a wireless response signal. Such security devices including locking mechanisms can be used to lock or otherwise secure one or more items. The items can include the unit to be charged. As illustrated in FIG. 3A, the combined wireless charger-and-interrogator 200 includes a locking mechanism 323. Locking mechanism 323 can be used to secure the unit under charge 322 to one or more of the locking mechanism itself 323 or the combined wireless charger-and-interrogator 200, either of which can be anchored to a secure structure, such as the tabletop 304, in order to present removal of the unit under charge 322 from the combined wireless charger-and-interrogator 200, while locked.

In some embodiments the unit under charge 322 is placed within a container, such as a briefcase, handbag, security container, and the like. The container can be placed upon the combined wireless charger-and-interrogator 200, such that wireless charging of the unit under charge 322 can occur wirelessly through the container. In at least some embodiments, referring to FIG. 3B, a container 200' itself serves as the charger and interrogator, for example, including components and functionality disclosed in relation to FIG. 1-2 and FIG. 4. The locking mechanism 323' can be used to control access to an interior of the container 200' as disclosed herein. The locking mechanism 323, 323' can be used to secure the container as described above in relation to the unit under charge 322. Alternatively or in addition the locking mechanism can be configured to lock or otherwise secure the unit under charge within the container. For example the locking mechanism can be a locking mechanism of the briefcase. Removal of either the briefcase or the unit under charge from the briefcase can be prevented or otherwise control by way of a separate transponder (e.g., RFID tag). An authorized user holding such an RFID tag that when brought in close proximity to the combined wireless charger-and-interrogator, allows for identification of the holder of the RFID tag as an authorized individual. Any of the locking mechanisms disclosed herein can be unlocked or otherwise unsecured, for example by an unlocking command from one or more of the controller or the server, upon detection of the RFID tag associated with the authorized individual. The locking mechanism can remain locked or otherwise secured upon interrogation of another RFID tag not associated with an authorized individual or failure to detect such an RFID tag.

In step 846, a determination of an approximate physical location of a source of the wireless reply signal, e.g., a transponder, can be determined. Such determination can be obtained by an estimation that the transponder is close to the combined wireless charger-and-interrogator. When the location of the combined wireless charger-and-interrogator is known a priori, the approximate location of the transponder can be inferred. Alternatively or in addition, a location of the transponder can be inferred from a location of the combined wireless charger-and-interrogator obtained by an external location source, such as a GPS receiver. Step 846 is shown in phantom suggesting that it is an optional step.

In step 848, one or more messages can be sent upon determination that an attempted and/or actual access to or movement of the unit under charge. The messages can include one or more categories of information, such as information identifying the type of message, e.g., unauthorized movement, information identifying an associated time of day and/or date, a location, etc. Step 848 is shown in phantom suggesting that it is an optional step.

Particular embodiments of wireless chargers disclosed herein can operate in accordance with one of a plurality of power-transmission protocols. These wireless charges are referred to herein as programmable.

In some embodiments, a web portal can be hosted by server applications operating from the server 112 illustrated in FIG. 1. Applications can include one or more of authentication applications to manage and track authorized usage and/or unauthorized attempted usage. Alternatively or in addition, applications can include controlling a security device, such as a locking mechanism, in response to determination of an authorized/non-authorized transponder in the vicinity of the combined wireless charger-and-interrogator. Still other applications can allow for management of operation of the wireless charger to selectively prevent wireless charging in relation to safety concerns, and/or managing user accounts, for example, to provide wireless charging services for fee. In a general sense, a general programming application can be provided to allow for development and implementation of user customizable applications.

The web portal can be used for managing services of the combined wireless charger-and-interrogator and other services supported by the combined wireless charger-and-interrogator. A web page of the web portal can be accessed by a Uniform Resource Locator (URL) with an Internet browser such as Microsoft's Internet Explorer™, Mozilla's Firefox™, Apple's Safari™ or Google's Chrome™ using an Internet-capable communication device, such as a personal computer, a portable computer, such as a laptop, a tablet computing device, and a mobile communication device, such as a feature phone or smart phone. The web portal can be configured, for example, to access the user-configurable controller 434, and services managed thereby such as security services, providing controllable access to one or more devices, safety services providing control of the combined wireless charger-and-interrogator to reduce or eliminate generation of a second wireless power signal under certain conditions, business applications, such as providing wireless charging services responsive to identified equipment, identified individuals, identified accounts and/or identified status of such accounts, etc. The web portal can also be used for provisioning wireless power charging services described herein, provisioning other services to equipment and/or authorized users associated with equipment to be charged, and so on.

The communication devices usable with any of the equipment, devices and systems disclosed herein can comprise a wireline and/or wireless transceiver, a wireless remote control, a power supply, a location receiver, a motion sensor, an orientation sensor, and a controller for managing operations thereof. The transceiver can support short-range or long-range wireless access technologies such as Bluetooth, Zig-Bee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver can also be adapted to support circuit-switched wireline access technologies (such as PSTN), packet-switched wireline access technologies (such as TCP/IP, VoIP, etc.), and combinations thereof.

The user interface 436 can include a depressible or touch-sensitive keypad with a navigation or pointing mechanism such as a roller ball, a joystick, a mouse, or a navigation disk for manipulating operations of the combined wireless charger-and-interrogator. The keypad can be an integral part of a housing assembly of the combined wireless charger-and-interrogator or an independent device operably coupled thereto by a tethered wireline interface (such as a USB cable) or a wireless interface supporting, for example, Bluetooth. The keypad can represent a numeric keypad commonly used by phones, and/or a QWERTY keypad with alphanumeric keys. The user interface 436 can further include a display such as monochrome or color LCD (Liquid Crystal Display), OLED (Organic Light Emitting Diode) or other suitable display technology for conveying images to an end user of the combined wireless charger-and-interrogator. In an embodiment where the display is touch-sensitive, a portion or all of the keypad can be presented by way of the display with navigation/pointing features.

The user interface 436 can also include an audio system that utilizes audio technology for conveying low volume audio (such as audio heard in proximity of a human ear) and high volume audio (such as speakerphone for hands free operation). The audio system can further include a microphone for receiving audible signals of an end user. The audio system can also be used for voice recognition applications. The user interface 436 can further include an image sensor such as a charged coupled device (CCD) camera for capturing still or moving images.

The controller 434 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the combined wireless charger-and-interrogator.

Other components not shown in the figures can be used in one or more embodiments of the subject disclosure. For instance, the combined wireless charger-and-interrogator can include a reset button (not shown). The reset button can be used to reset the user-configurable controller 210, 434 of the combined wireless charger-and-interrogator 200, 400. In yet another embodiment, the combined wireless charger-and-interrogator can also include a factory default setting button operable to force the combined wireless charger-and-interrogator to re-establish factory settings. The combined wireless charger-and-interrogator can also include a slot for adding or removing another module such as a Subscriber Identity Module (SIM) card. SIM cards can be used for identifying subscriber services, executing programs, storing subscriber data, and so forth.

Upon reviewing the aforementioned embodiments, it would be evident to an artisan with ordinary skill in the art that said embodiments can be modified, reduced, or enhanced without departing from the scope of the claims described below. For example, the interrogator can be replaced by a wireless transceiver adapted to communicate with a remote transceiver or transponder according to the various techniques disclosed herein. Such wireless interrogation and/or communications can include near-field communicators and far-field communicators. Such modes of wireless interrogation can include one or more of radio frequency communications, acoustic communications or light wave communications. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
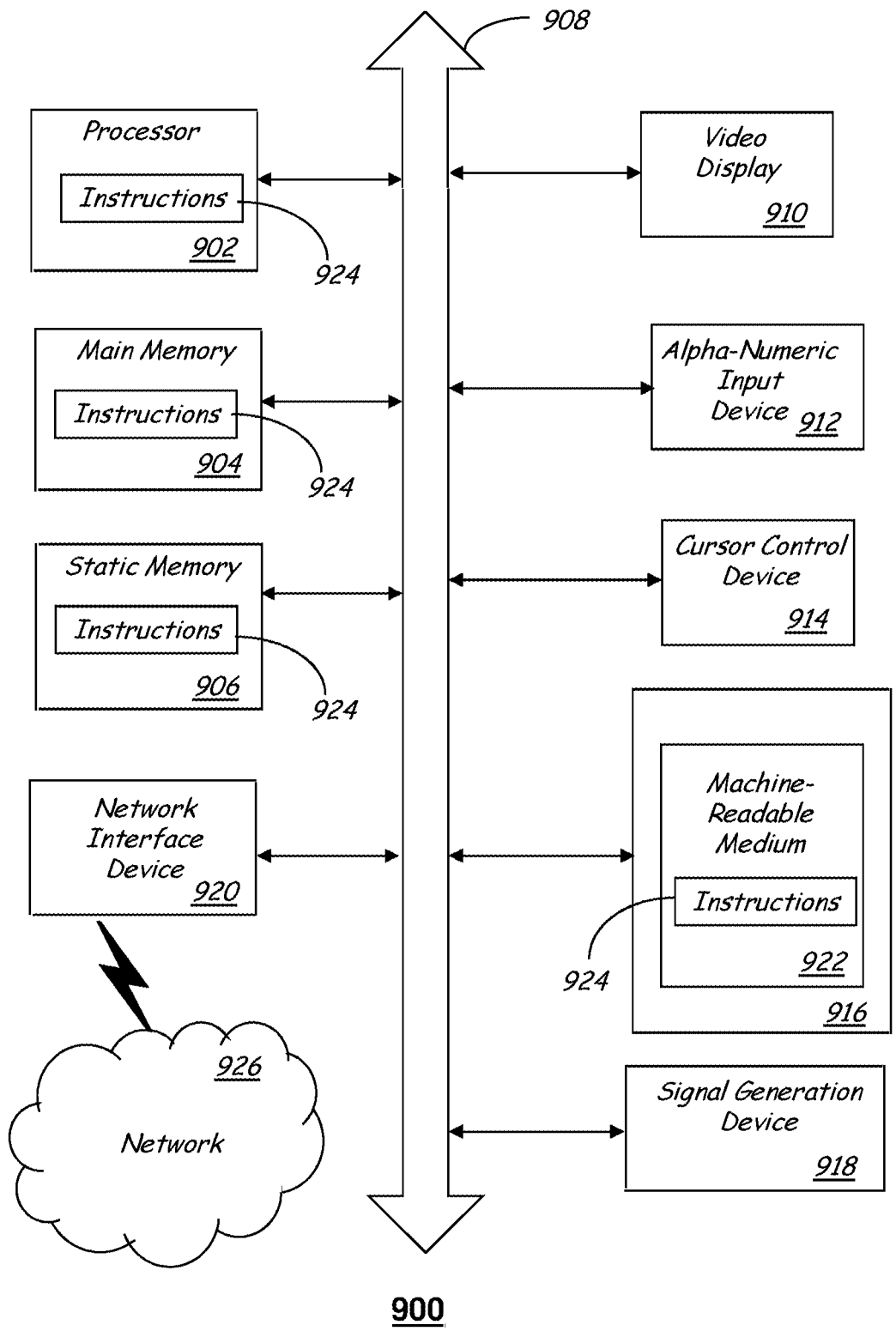
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods describe above. One or more instances of the machine can operate, for example, as the server 112 (FIG. 1), the control circuitry 210 (FIG. 2), the power handling circuitry 410, the interrogator 420, and the user configurable controller 434 (FIG. 4). In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a control device of the subject disclosure includes broadly any electronic device that provides a control capability. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display. The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within one or more computer-readable storage devices, such as the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable device may perform such operations on the controllable device directly or indirectly by way of an intermediate device directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

In some embodiments, one or more housings such as the housing 230 of FIG. 2 may be removably (or permanently) connected with each other. For example, FIGS. 10A-H illustrate a first housing 1000 physically linked to a second housing 1002 via a flexible connection 1004 in accordance with various embodiments. The housings 1000 and 1002 may include similar components as and operate similarly to the devices of previous embodiments, such as the housing 230 of FIG. 2.

Housing 1000 may include a first control logic 1006, a first coil and accompanying circuitry 1008 (for simplicity, "first coil 1008"), a second coil and accompanying circuitry 1010 (for simplicity, "second coil 1010"), a battery 1012 (e.g., a rechargeable battery), and an orientation sensor 1014. The first control logic 1006 may control the functioning of the first coil 1008 and the second coil 1010 depending on the orientation of the first housing 1000 as determined by the orientation sensor 1014. The first coil 1008 and the second coil 1010 may each function as both a receiver coil and a transmitter coil.

Housing 1002 may be similarly configured. That is, housing 1002 may include a second control logic 1016, a first coil and accompanying circuitry 1008' (for simplicity, "first coil 1008"), a second coil and accompanying circuitry 1010' (for simplicity, "second coil 1010"), a battery 1018, and an orientation sensor 1020. The second control logic 1016 may control the functioning of the first coil 1008' and the second coil 1010' depending on the orientation of the second housing 1002 as determined by the orientation sensor 1020. The first coil 1008' and the second coil 1010' may each function as both a receiver coil and a transmitter coil.

The connection 1004 may be an electrically wired connection between the first housing 1000 and the second housing 1002. This permits the first control logic 1006 of the first housing 1000 and the second control logic 1016 of the second housing 1002 to transfer power between the batteries of the first and second housings 1000, 1002.

The orientation sensors 1014 and 1020 may include any type of device whether available now or invented hereafter as long as it can gather data regarding the orientations of the housings 1000 and 1002, respectively. Applicant also notes that the housings 1000 and 1002 and the connection 1004 are not drawn to scale.

Figure 10A:
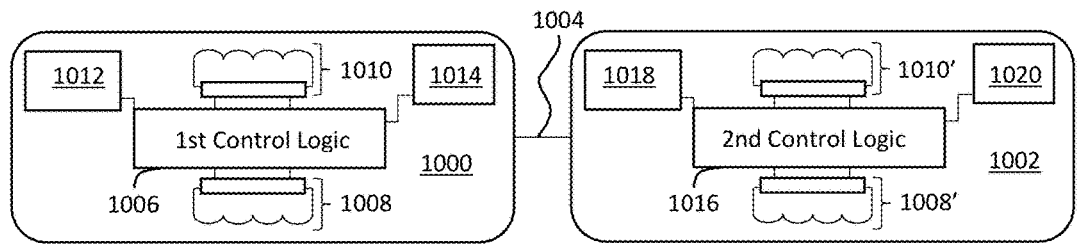
FIGS. 10A-H illustrate multiple housings connected via a flexible connection in accordance with various embodiments.
Figure 10B:
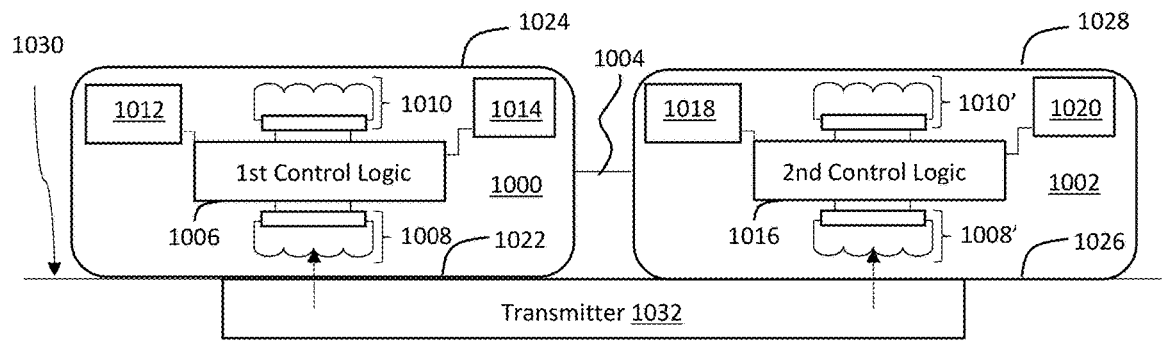

FIG. 10B illustrates the housing 1000 with a first surface 1022 and a second surface 1024, and illustrates housing 1002 with a first surface 1026 and a second surface 1028. The housings 1000 and 1002 may be positioned on or otherwise in proximity to an external surface 1030 that has one or more wireless transmitters 1032 embedded therewith. As seen in FIG. 10B the first surfaces 1022 and 1026 may be in contact with the external surface 1030.

In the orientations of housings 1000 and 1002 shown in FIG. 10B, the first coils 1008 and 1008' may function as receiver coils to wirelessly receive power from the transmitter 1032. For example, the orientation sensor 1014 may sense that housing 1000 is in this particular orientation so that the first control logic 1006 controls the first coil 1008 to function as a receiver coil. Similarly, the second control logic 1016 may control the first coil 1008' to function as a receiver coil based on orientation data from orientation sensor 1020.

Figure 10C:
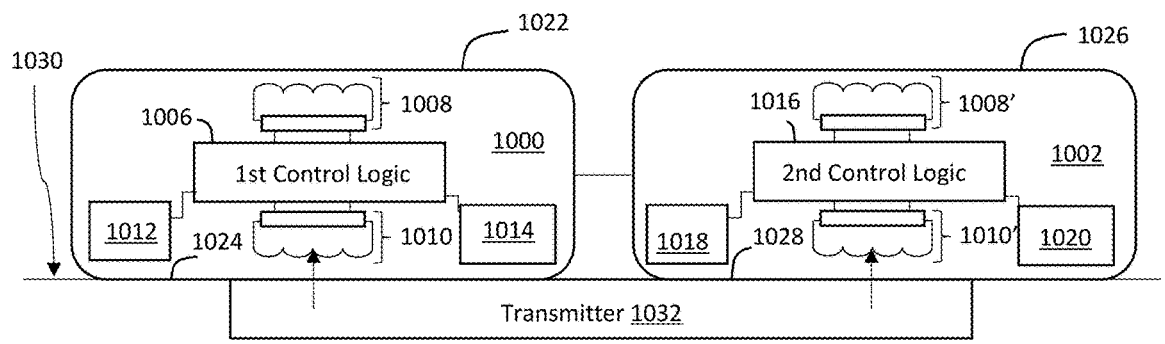

FIG. 10C shows housings 1000 and 1002 of FIGS. 10A & B. However, both housings 1000 and 1002 have been flipped over such that surfaces 1024 and 1028 are now in contact with the external surface 1030. The orientation sensor 1014 may recognize that the orientation of the housing 1000 has changed and may communicate this data to the first control logic 1006. The first control logic 1006 may then control the second coil 1010 to function as a receiver coil to wirelessly receive power from the transmitter 1032. Similarly, the orientation sensor 1020 may recognize that the orientation of the housing 1002 has changed, and the second control logic 1016 may instruct the second coil 1010' to function as a receiver coil to wirelessly receive power from the transmitter 1032.

Figure 10D:
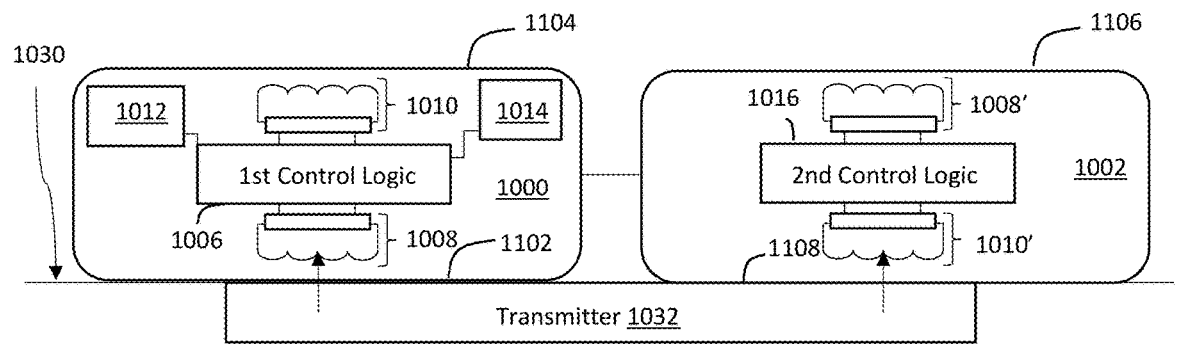

FIG. 10D illustrates the first housing 1000 in the orientation shown in FIG. 10A (i.e., with the first coil 1008 adjacent to the transmitter 1032. As in FIG. 10D, the first coil 1008 may function as a receiver coil to wirelessly receive power from the transmitter 1032. Housing 1002, on the other hand, is in the orientation shown in FIG. 10B such that the second coil 1010' is adjacent to the transmitter 1032 and wirelessly receives power therefrom. Accordingly, FIG. 10D illustrates that the functionality of the coils of each housing may be independent of the functionality of the coils of the other housing.

Figure 10E:
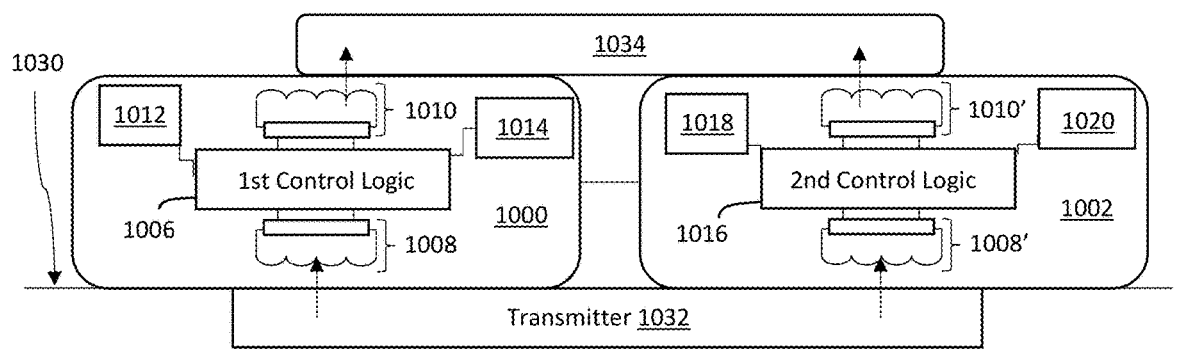

FIG. 10E illustrates the housings 1000 and 1002 with an electronic device 1034 placed thereon. The electronic device 1034 may be any type of electronic device to be charged. The electronic device 1034 may be configured as, for example and without limitation, a smartphone, a smartwatch, a tablet, a media player, a portable charging device, a speaker, a light source, or any other device to be charged or otherwise to wirelessly receive power. In some embodiments, the electronic device 1034 may be configured similarly to and include the same components as housing 1000 or housing 1002.

The electronic device 1034 to be charged may be similar to the devices to be charged 222 of FIG. 2 and include the same or similar components. Upon the electronic device 1034 being placed on one or more of the housings 1000 and 1002, the second coils 1010 and 1010' may function as transmitter coils to wirelessly transmit power to the electronic device 1034. For example, the first control logic 1006 may detect or otherwise receive a signal from a transponder in the electronic device 1034 (as discussed above) indicating that the electronic device 1034 is within sufficient proximity from the housing 1000 to wirelessly receive power therefrom.

Upon receiving the signal from the transponder in the electronic device 1034, the first control logic 1006 may instruct the second coil 1010 to function as a transmitter coil to wirelessly provide power to the electronic device 1034. Additionally or alternatively, the second control logic 1016 may receive a signal from a transponder device in the electronic device 1034 (as discussed above), and the second control logic 1016 may instruct the second coil 1010' to function as a transmitter coil to wirelessly provide power to the electronic device 1034.

As seen in FIG. 10E, the housings 1000 and 1002 may wirelessly provide power to the electronic device 1034 at the same time as receiving power from the transmitter 1032. That is, the second coils 1010 and 1010' may provide power to the electronic device 1034 simultaneously with the first coils 1008 and 1008' receiving power from the transmitter 1032.

Figure 10F:
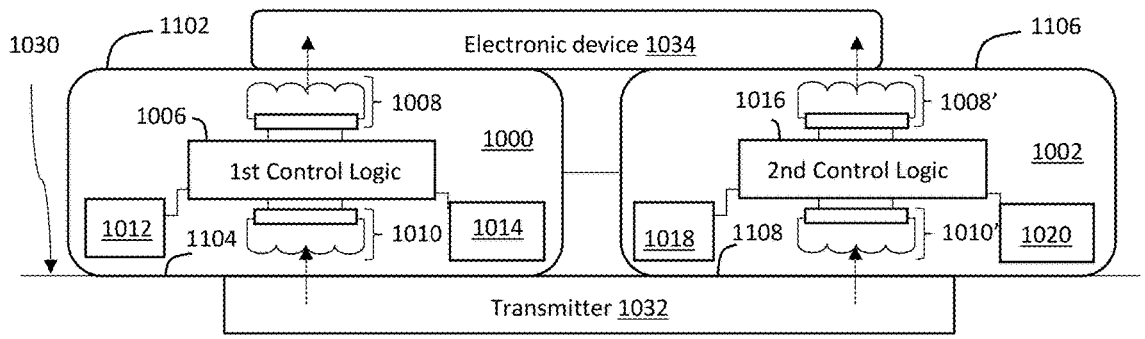

FIG. 10F similarly shows the housings 1000 and 1002 with the electronic device 1034 placed thereon. However, FIG. 10F shows that the housings 1000 and 1002 have been flipped such that the first coils 1008 and 1008' are now adjacent to the electronic device 1034. In this case, the first control logic 1006 may similarly receive a signal from the electronic device 1034 indicating the electronic device 1034 is in proximity to the first housing 1000, and then instruct the first coil 1008 to function as a transmitter coil to wirelessly provide power to the electronic device 1034 (e.g., at the same time the second coil 1010 is receiving power from the transmitter 1032).

Figure 10G:
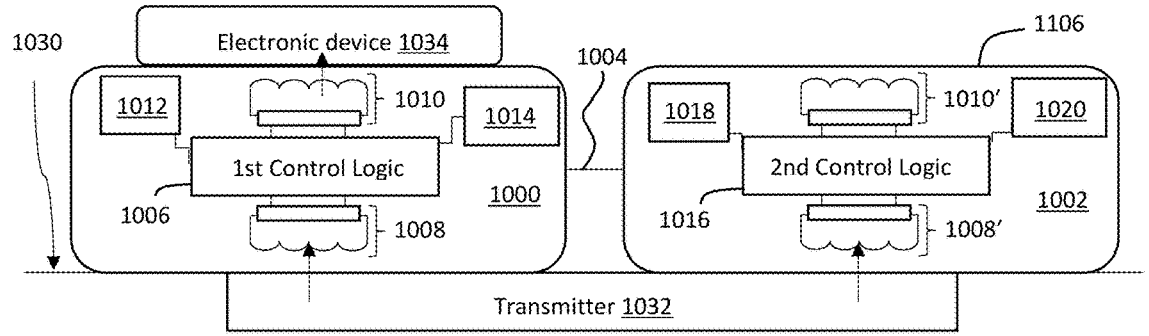

In some embodiments, and as seen in FIG. 10G, the electronic device 1034 may be placed on only one of the housings (e.g., housing 1000). In this case, both housing 1000 and 1002 can wirelessly receive power from the transmitter 1032, but only the housing 1000 is wirelessly providing power to the electronic device 1034. The second housing 1002 may store the power received from the transmitter 1032 in the battery 1018 for later use (e.g., if an electronic device is placed on the housing 1002 at a later time), or may provide the power to the first housing 1000 via the wired connection 1004.

Figure 10H:
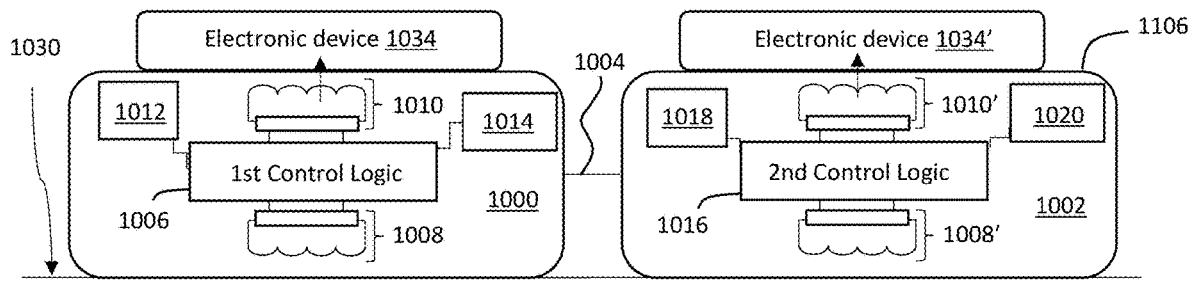

Similarly, the housings 1000 and 1002 may store power and then wirelessly provide power to external electronic devices even when not receiving power from a transmitter. FIG. 10H, for example, illustrates the housings 1000 and 1002 providing power to electronic devices 1034 and 1034'. However, the housings 1000 and 1002 are not positioned on or otherwise receiving power from a transmitter as in FIGS. 10B-G. Rather, the housings 1000 and 1002 may rely on power stored in the batteries 1012 and 1018 to provide power to the respective electronic devices 1034 and 1034'.

The embodiments shown in FIGS. 10A-H are merely exemplary. For example, a single housing 1000 may perform the simultaneous transmittal and reception of power as discussed previously (e.g., and without being connected to a second housing). Similarly, the coils of a single housing may function as either a receiving coil or a transmittal coil without the housing being connected to a second housing.

Figure 11A:
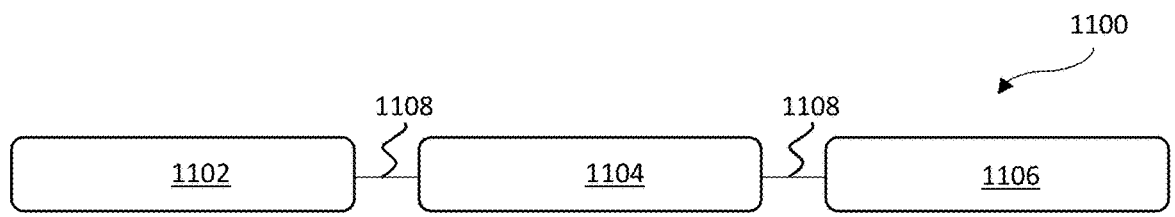
FIGS. 11A-F illustrate a three-housing charging apparatus in accordance with multiple embodiments.

In other embodiments, more than two housings may be connected with each other. For example, FIG. 11A illustrates a charging apparatus 1100 with three housings 1102, 1104, and 1106. Each housing may be similarly configured to and have the same components as housings 1000 or 1002 of FIGS. 10A-H. The housings 1102, 1104, and 1106 may also be similarly linked via flexible connections 1108. Although three housings are shown in FIG. 11A, less than or fewer than three housings may be similarly connected.

Figure 11B:
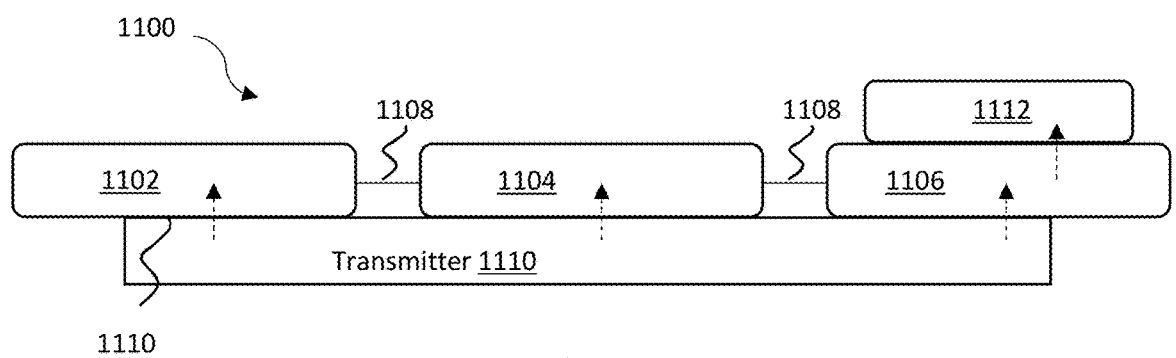

The applications of the charging apparatus 1100 may vary and may include embodiments or configurations discussed previously. For example, FIG. 11B illustrates the three housings 1102, 1104, and 1106 each placed on a transmitter 1110 and wirelessly receive power therefrom. Housing 1106 also has an electronic device 1112 placed thereon, such that the housing 1106 can wirelessly provide power to said electronic device 1112.

Although housings 1102 and 1104 are not wirelessly providing power to an external device (as there are no devices placed on housings 1102 or 1104), they may nonetheless provide power to housing 1106 via the wired connections 1108. The provided power may then be used to wirelessly provide power to the electronic device 1112. This would most likely be useful in the event that one or more of the housings 1102, 1104, and 1106 were not receiving power from the transmitter 1110, and were instead relying on power previously stored in their respective batteries. In this situation, the electronic device 1112 may be charged more quickly as it essentially receiving power from multiple housings.

Figure 11C:
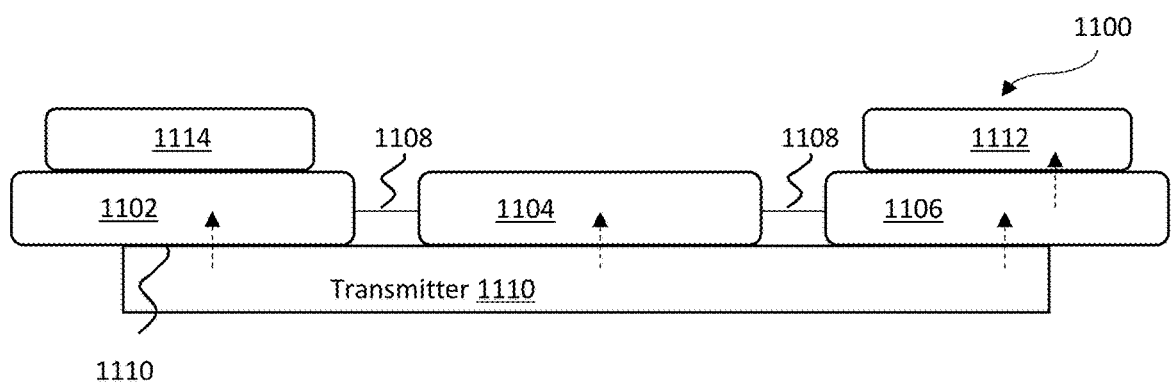

Similarly, FIG. 11C illustrates the charging apparatus 1100 with an electronic device 1114 placed on and receiving power from housing 1102, and an electronic device 1112 placed on and receiving power from housing 1106. Although electronic device 1112 is receiving power from housing 1106, it will not charge as quickly as in FIG. 11B because electronic device 1114 is also receiving power from housing 1102. Housing 1104 may also be providing power to one or more of housings 1102 and 1106 via the wired connections 1108.

Figure 11D:
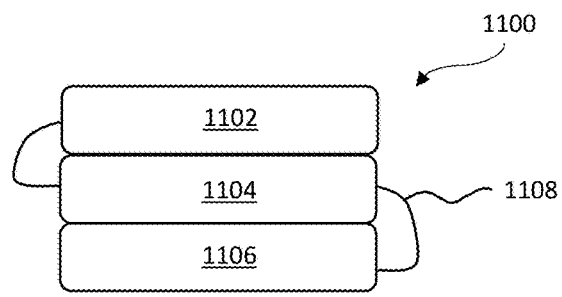

FIG. 11D illustrates another embodiment in which the charging apparatus 1110 is in a stacked configuration. That is, the housings of the charging apparatus 1110 may be stacked on top of each other and remain connected by the wired connections 1108. Although only three housings are shown in the stacked configuration in FIG. 11D, less than or fewer than three housings may be stacked on top of each other.

This stacked configuration may not only save space, but may also enable the housings to wirelessly provide power to and wirelessly receive power from other housings and allow the batteries of all housings to be charged on a single transmitter. The control logics of the housings may instruct the respective coils thereof to operate as either a transmitter coil or a receiver coil.

For example, the control logic of housing 1104 may instruct the coil in housing 1104 adjacent to housing 1102 to function as a transmitter coil, and the control logic of housing 1102 may instruct the coil in housing 1102 adjacent to housing 1104 to function as a receiver coil. For example, the battery of housing 1102 may be dead and in need of charging. In this case, housing 1104 can wirelessly provide power to housing 1102.

Figure 11E:
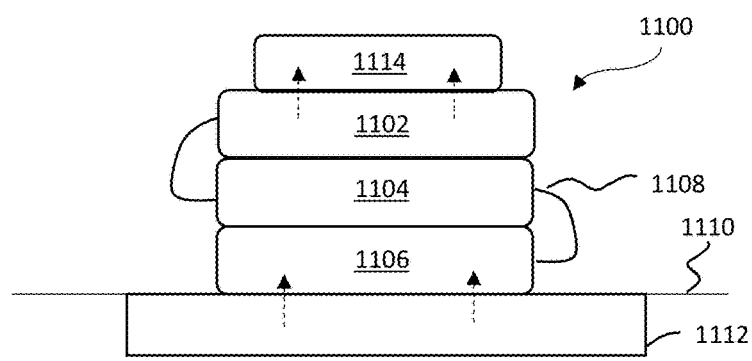

As in previous embodiments, the charging apparatus 1100 in a stacked configuration may be placed on a surface 1110 with a transmitter 1112 embedded therein. In this case, and as shown in FIG. 11E, the housing 1106 may wirelessly receive power from the transmitter 1112. That is, the coil in housing 1106 that is adjacent to the transmitter 1112 may function as a receiver coil to receive power from the transmitter 1112. Moreover, in the stacked configuration, the batteries of all housings may be charged when placed on a single transmitter 1112.

Similarly, an electronic device 1114 may be placed on housing 1102 to wirelessly receive power therefrom. That is, the coil in housing 1102 that is adjacent to the electronic device 1114 may function as a transmitter coil to wirelessly transmit power to the electronic device 1114.

As discussed previously, the charging apparatus 1100 isn't required to be placed on a transmitter 1112 to charge an electronic device 1114. In other words, even if the apparatus 1100 (or a housing thereof) isn't currently being charged or otherwise receiving power from a transmitter 1112, the apparatus 1100 (or a housing thereof may still transmit power to an electronic device 1114. In these situations, a housing such as the housing 1102 may rely on power stored in the battery of one or more of the housings.

Similarly, the housings (in a stacked or unstacked configuration) can be placed on one or more transmitters to receive power therefrom even if none of the housings are currently transmitting power to an electronic device. In these cases, the housings are receiving power to store in their respective batteries for later transmittance.

Figure 11F:
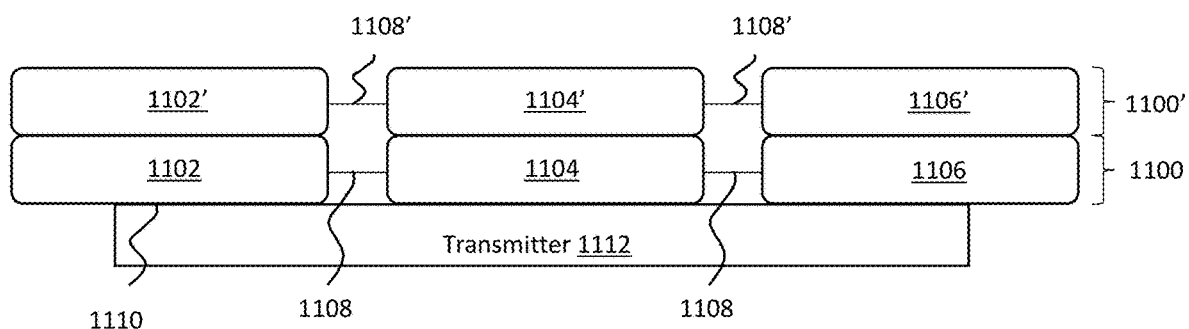

FIG. 11F illustrates another embodiment, in which a charging apparatus 1100' is placed on the charging apparatus 1100 of FIGS. 11A-E. As seen in FIG. 11F, apparatus 1100' comprises housings 1102', 1104', and 1106', which may each include the same types of components as housings 1102, 1104, and 1106 (i.e., first and second coils that are each configured to function as a transmitter coil and receiver coil, a battery, control logic, an orientation sensor, etc.).

Power may be transferred between the housings of apparatus 1100 and apparatus 1100'. In this configuration, power may be transferred between housings of the apparatus 1100 and apparatus 1100' wirelessly, and power may transferred amongst the housings of the apparatus 1100 and amongst the housings of apparatus 1100' via the wired connections 1108 and 1108', respectively. One or more of the housings 1102, 1104, and 1106 may receive power wirelessly from one or more transmitters 1112 as discussed previously. Although not shown in FIG. 11F, electronic devices may be placed on one or more of the housings 1102', 1104', and 1106' to wirelessly receive power therefrom as discussed above.

Figure 12:
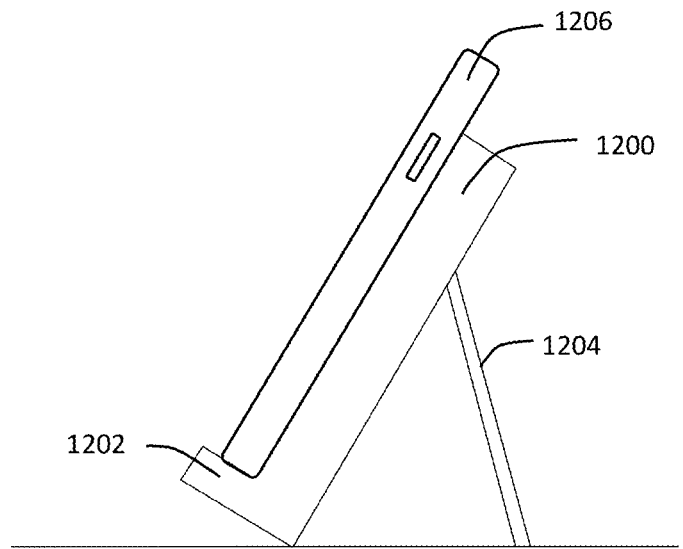
FIG. 12 illustrates a housing with a protrusion in accordance with one embodiment.

Although the above discussions in conjunction with FIGS. 10A-E and FIGS. 11A-F largely describe the housings as being placed directly on top of transmitters, and electronic devices being placed directly on the housings, other configurations are possible. For example, FIG. 12 illustrates a side view of a housing 1200 with a protrusion 1202 and a support portion 1204. The housing 1200 may be similar to, include the same components as, and function similarly to the housings 1000 and 1002 of FIGS. 10A-H or the housings 1102, 1104, and 1106 of FIGS. 11A-E.

The protrusion 1202 may vary in size and depth and may support an electronic device 1206 such as a mobile phone or another housing. The support 1204 may also prop the housing 1200 (and therefore the electronic device 1206) at an angle so that a user can view the screen of the electronic device in a more convenient manner. Accordingly, a user may view the content of the electronic device 1206 while the electronic device 1206 is being charged by the housing 1200 in accordance with the above teachings. The support 1204 may be attached to the housing 1200 via a hinge or other suitable mechanism such that it can be extended in use and retracted when not in use.

Figure 13:
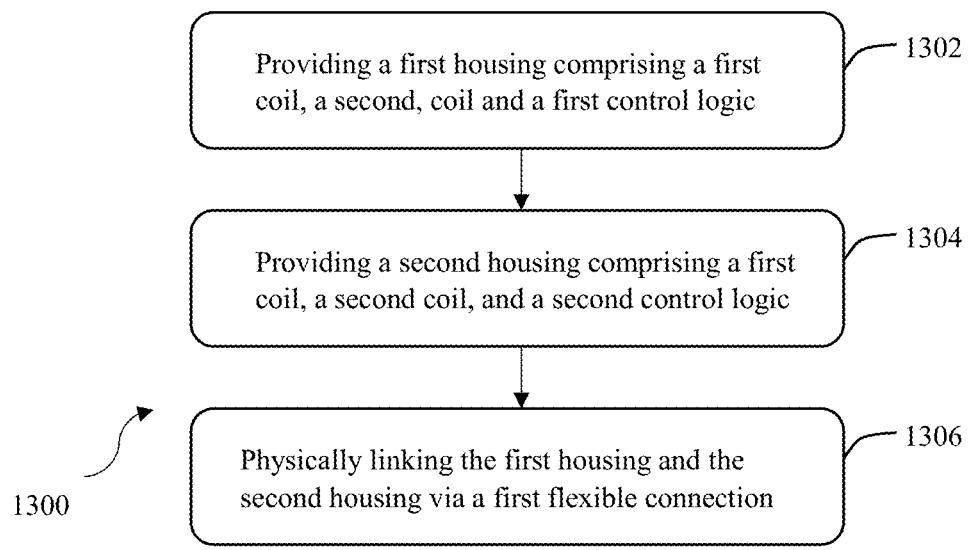
FIG. 13 depicts a flowchart of a method for charging a device in accordance with one embodiment.

FIG. 13 depicts a flowchart of a method 1300 for charging a device in accordance with one embodiment. Step 1302 involves providing a first housing comprising a first coil, a second coil, and a first control logic to control the functioning of the first and second coil of the first housing depending on an orientation of the first housing, wherein each of the first coil and the second coil of the first housing can function as both a receiver coil and a transmitter coil. The first housing may be similar to the housing 1000 of FIGS. 10A-H, for example.

Step 1304 involves providing a second housing comprising a first coil, a second coil, and a second control logic to control the functioning of the first and second coil of the second housing depending on an orientation of the second housing, wherein each of the first coil and the second coil of the second housing can function as both a receiver coil and a transmitter coil. The second housing may be similar to housing 1002 of FIGS. 10A-H, for example.

Step 1306 involves physically linking the first housing and the second housing via a first flexible connection. This may be a removable connection such that the housings can be connected to at least transfer power between housings when in use or disconnected when not in use.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method of charging a device, the method comprising: providing a first housing comprising a first coil, a second coil, and a first control logic to control the functioning of the first and second coil depending on an orientation of the first housing, wherein each of the first coil and the second coil of the first housing can function as both a receiver coil and a transmitter coil, and at least one of the first coil or the second coil include a ferrite material able to detect a magnetic field associated with the device and the first control logic controls the functioning of the first coil and second coil based on the detection of the magnetic field.

2. The method of claim 1 further comprising configuring the first housing with a rechargeable battery.

3. The method of claim 1 further comprising configuring the first housing with an orientation sensor to determine the orientation of the housing with respect to the device based at least in part on the detected magnetic field.

4. The method of claim 3 further comprising configuring the first control logic of the first housing to:
control the first coil of the first housing to function as a receiver coil and the second coil of the first housing to function as a transmitter coil when the first housing is in a first orientation, and
control the first coil of the first housing to function as a transmitter coil and the second coil of the first housing to function as a receiver coil when the first housing is in a second orientation.

5. The method of claim 1 further comprising configuring the first housing with a flexible connection that is configured to be removably connected to the first housing and a second housing.

6. The method of claim 1 wherein either of the first coil or the second coil of the first housing functions as a receiver coil to wirelessly receive power from a transmitter configured as a second housing including a first coil, a second coil, and a third control logic to control the functioning of the first and second coil of the second housing.

7. The method of claim 1 wherein either of the first coil or the second coil of the first housing functions as a transmitter coil to wirelessly transfer power to an electronic device configured as a second housing including a first coil, a second coil, and a third control logic to control the functioning of the first and second coil of the second housing.

8. The method of claim 1 further comprising providing a second housing comprising a first coil, a second coil, and a second control logic to control the functioning of the first and second coil of the second housing depending on an orientation of the second housing, wherein the first housing and the second housing are configured to simultaneously wirelessly transmit power to an electronic device, simultaneously receive power from a transmitter, and receive and transmit the power simultaneously.

9. The method of claim 8 further comprising:
providing a third housing comprising a first coil, a second coil, a battery, and a third control logic to control the functioning of the first and second coil of the third housing depending on an orientation of the third housing, wherein each of the first coil and the second coil of the third housing can function as both a receiver coil and transmitter coil; and
physically linking the second housing with the first housing via a first flexible connection and physically linking the third housing with the second housing via a second flexible connection.

10. A charging system, the system comprising:
a first housing comprising a first coil, a second coil, and a first control logic to control the functioning of the first and second coil of depending on an orientation of the first housing, wherein each of the first coil and the second coil of the first housing can function as both a receiver coil and a transmitter coil, and at least one of the first coil or the second coil include a ferrite material able to detect a magnetic field associated with the device and the first control logic controls the functioning of the first coil and second coil based on the detection of the magnetic field.

11. The system of claim 10 wherein the first housing further includes an orientation sensor to determine the orientation of the housing with respect to the device based at least in part on the detected magnetic field.

12. The system of claim 10 wherein a coil of the first housing is configured to function as a receiver coil to wirelessly receive power from a transmitter.

13. The system of claim 10 wherein a coil of the first housing is configured to function as a transmitter coil to wirelessly transmit power to at least one electronic device.

14. The system of claim 13 wherein the first coil is configured to function as a receiver coil to wirelessly receive power from a transmitter simultaneously with the second coil of the first housing wirelessly transmitting power to at least one electronic device.

15. The system of claim 10 further comprising:
a second housing comprising a first coil, a second coil, and a second control logic to control the functioning of the first and second coil of the second housing depending on an orientation of the second housing, wherein each of the first coil and the second coil of the second housing can function as both a receiver coil and a transmitter coil; and
a first flexible connection physically linking the second housing and the first housing.

16. The system of claim 11 wherein the first control logic of the first housing is configured to:
control the first coil of the first housing to function as a receiver coil and the second coil of the first housing to function as a transmitter coil when the first housing is in a first orientation, and
control the first coil of the first housing to function as a transmitter coil and the second coil of the first housing to function as a receiver coil when the first housing is in a second orientation.

\* \* \* \* \*